(12) United States Patent
Abbott

(10) Patent No.: US 11,911,882 B2
(45) Date of Patent: Feb. 27, 2024

(54) TOOL BITS AND BIT HOLDERS HAVING NON-CIRCULAR CROSS-SECTIONS

(71) Applicant: MILWAUKEE ELECTRIC TOOL CORPORATION, Brookfield, WI (US)

(72) Inventor: Jonathan E. Abbott, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 86 days.

(21) Appl. No.: 17/675,344

(22) Filed: Feb. 18, 2022

(65) Prior Publication Data

US 2022/0168872 A1 Jun. 2, 2022

Related U.S. Application Data

(63) Continuation of application No. 16/132,778, filed on Sep. 17, 2018, now abandoned.

(60) Provisional application No. 62/559,034, filed on Sep. 15, 2017.

(51) Int. Cl.
| | |
|---|---|
| *B25B 23/00* | (2006.01) |
| *B23B 31/00* | (2006.01) |
| *B23B 31/12* | (2006.01) |

(52) U.S. Cl.
CPC ........ *B25B 23/0035* (2013.01); *B23B 31/005* (2013.01); *B23B 31/1215* (2013.01); *B23B 2231/0232* (2013.01); *B23B 2231/22* (2013.01)

(58) Field of Classification Search
CPC ... B25B 23/0035; B25B 23/005; B25B 23/08; B25B 23/0021; B25B 15/001; B23B 31/005; B23B 31/1215; B23B 2231/0232; B23B 2231/22; B25G 3/18; B25G 3/26
See application file for complete search history.

(56) References Cited

U.S. PATENT DOCUMENTS

| | | | |
|---|---|---|---|
| 2,202,240 | A | 5/1940 | Trotter |
| 2,990,189 | A | 6/1961 | Beers |
| 5,012,704 | A | 5/1991 | Wing |
| 8,752,455 | B1 | 6/2014 | Taylor, Jr. |
| 2013/0087981 | A1* | 4/2013 | Meng .................. B25B 23/0035 279/78 |
| 2016/0193723 | A1* | 7/2016 | Su ....................... B25B 23/0035 81/177.85 |

FOREIGN PATENT DOCUMENTS

| | | | |
|---|---|---|---|
| DE | 102014104508 | * | 10/2015 |
| WO | WO 2012142679 | * | 10/2012 |

* cited by examiner

*Primary Examiner* — Robert J Scruggs
(74) *Attorney, Agent, or Firm* — Michael Best & Friedrich LLP

(57) ABSTRACT

A tool bit connectable to a tool. The tool bit including a tool body having a working end portion, an insertion end portion, and an outer surface formed on the insertion end portion. The insertion end portion defines an end of the tool body and configured to be coupled to the tool. The tool bit also includes a non-circular profile formed on the tool body and partially defining the outer surface, and an alignment region positioned between the non-circular profile and the end of the tool body. The alignment region partially defines the outer surface to facilitate alignment of the non-circular profile with the tool.

20 Claims, 25 Drawing Sheets

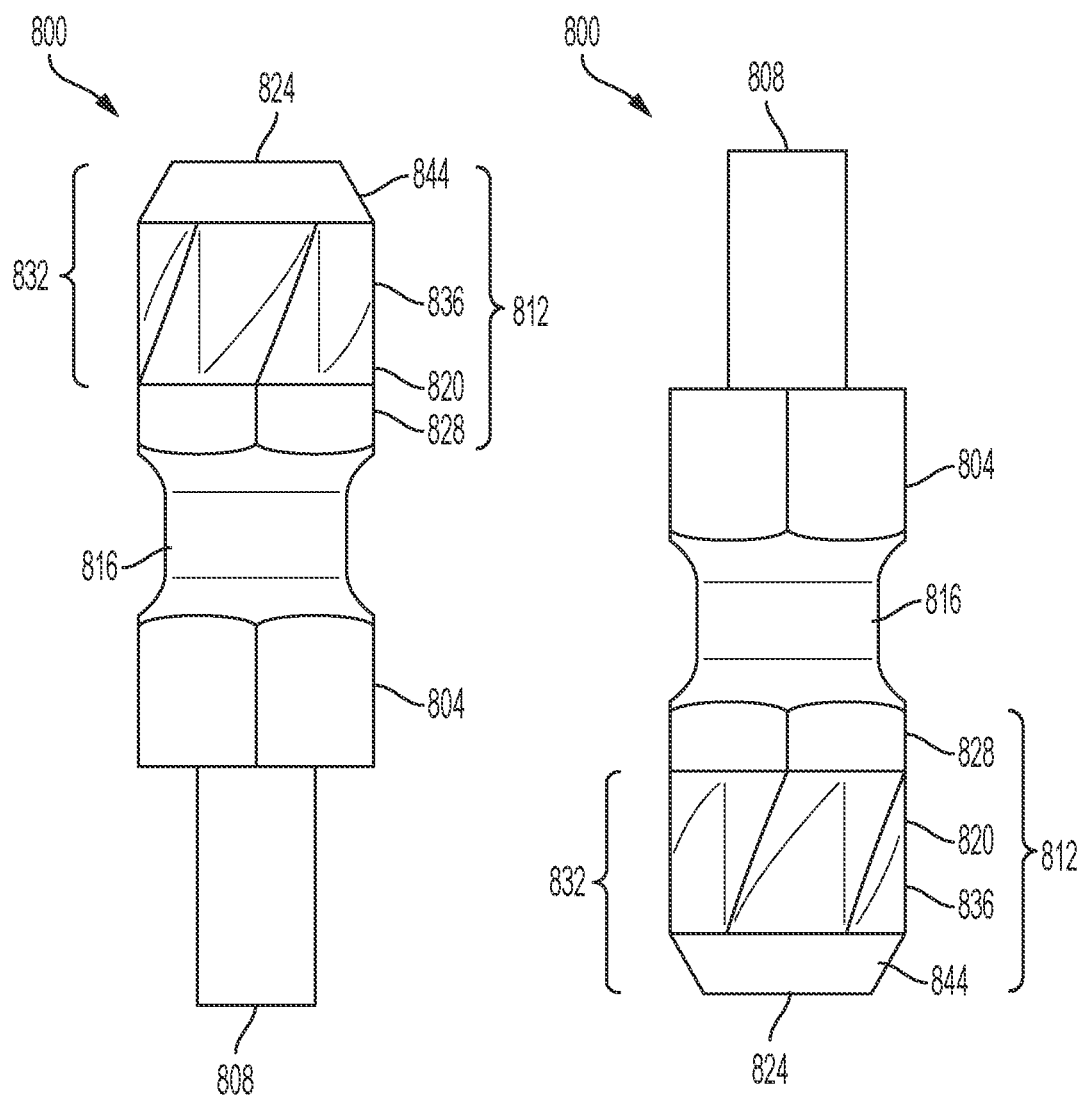

TOOL BITS AND BIT HOLDERS HAVING NON-CIRCULAR CROSS-SECTIONS

CROSS-REFERENCE TO RELATED APPLICATIONS

This application is a continuation of U.S. patent application Ser. No. 16/132,778, filed on Sep. 17, 2018, which claims priority to U.S. Provisional Patent Application No. 62/559,034, filed on Sep. 15, 2017, the entire contents of all of which are incorporated herein by reference.

FIELD OF THE INVENTION

The present invention relates to bit holders and, more particularly, to bit holders for receiving tool bits having non-circular cross-sections. The bit holders may include, for example, a tool chuck, a driver bit, a case for storing bits when not in use, and the like. The present invention also relates to non-circular tool bits that are modified to facilitate inserting into bit holders.

BACKGROUND

It is becoming increasingly common to find drill and impact bits/accessories that are non-circular. These non-circular bits include hex bits, three flat bits, square socket adapters, and special profile bits like SDS-max bits. These bits are usually inserted into corresponding female chuck openings. A simple and primary example is a hex bit inserted into a hex-shaped hole.

Bit-insertion for non-circular bits has a pain point that the bits must be aligned to be inserted. Often, small fillets, chamfers, blends, or similarly smooth surfaces—whether spherical or following a profile edge—assist this insertion. However, even with these fillets and chamfers, it is common for a bit to need a small rotation to finally align and slide in a corresponding hole.

When non-circular bits are inserted into tools, users often must manually orientate the bit or the tool to match each other. Usually this is done by slightly rotating the bit until it slides in. For a hex bit, this would correspond to up to about a sixth of a turn. This extra step slows down the bit insertion process and provides a mild inconvenience.

SUMMARY

The present invention is directed to a set of profiles that help to automatically align non-circular bits into their corresponding holes. More particularly, the profiles aid the axial insertion of non-circular bits into corresponding spaces. The profiles are made to ideally avoid undercuts, aiding manufacturing.

In one embodiment, the invention provides a tool bit holder for connecting a tool bit to a tool. The tool bit holder includes a tool body having a first end portion configured to connect to the tool, a second end portion, and a hollow interior configured to receive the tool bit. The second end portion defines an end of the tool body. The hollow interior extends through the end. The tool bit holder also includes a non-circular profile formed in the tool body and partially defining the hollow interior. The tool bit holder further includes an alignment region positioned between the end of the tool body and the non-circular profile. The alignment region partially defines the hollow interior to facilitate alignment of the tool bit with the non-circular profile.

In another embodiment, the invention provides a tool bit connectable to a tool. The tool bit includes a tool body having a working end portion, an insertion end portion, and an outer surface formed on the insertion end portion. The insertion end portion defines an end of the tool body and is configured to be coupled to the tool. The tool bit also includes a non-circular profile formed on the tool body and partially defining the outer surface. The tool bit further includes an alignment region positioned between the non-circular profile and the end of the tool body. The alignment region partially defines the tool surface to facilitate alignment of the non-circular profile with the tool.

In yet another embodiment, the invention provides a chuck for connecting a tool bit to a tool. The chuck includes a plurality of jaws arranged about a central longitudinal axis in a radially symmetrical pattern. The plurality of jaws together defines a hollow interior configured to receive the tool bit. Each jaw includes a first end portion configured to connect to the tool and a second end portion. The second end portions define an end of the plurality of jaws. The hollow interior extends through the end. The chuck also includes a non-circular profile formed by the plurality of jaws and partially defining the hollow interior. The chuck further includes an alignment region positioned between the end of the plurality of jaws and the non-circular profile. The alignment region partially defines the hollow interior to facilitate alignment of the tool bit with the non-circular profile.

In still another embodiment, the invention provides a method for inserting a tool bit into a bit holder. The tool bit includes a bit body having a working end portion, an insertion end portion defining an end of the bit body, and an outer surface formed on the insertion end portion. The tool bit holder includes a holder body having a first end portion configured to connect to a tool, a second end portion defining an end of the holder body, and a hollow interior extending through the end. The method includes providing a non-circular profile on the bit body that partially defines the outer surface, providing a non-circular profile in the holder body that partially defines the hollow interior, and providing an alignment region. Providing the alignment region includes providing the alignment region on the bit body between the end of the bit body and the non-circular profile, and/or providing the alignment region on the holder body between the end of the holder body and the non-circular profile. The method also includes inserting the end of the bit body into the hollow interior of the tool bit holder in any orientation. The method further includes engaging the alignment region with the insertion end portion of the tool bit and/or with the second end portion of the tool bit holder to automatically align the non-circular profile on the bit body with the non-circular profile in the holder body.

Other aspects of the invention will become apparent by consideration of the detailed description and accompanying drawings.

BRIEF DESCRIPTION OF THE DRAWINGS

FIG. 30 is a first side view of the tool bit of FIG. 27.

FIG. 31 is a second side view of the tool bit of FIG. 27.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
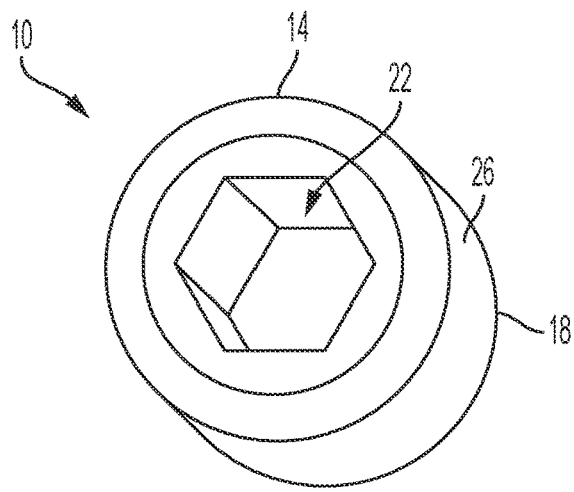
FIG. 1 is a perspective view of a conventional bit holder.

FIG. 1 illustrates a conventional bit holder 10, showing a female part for which there is no fillet or chamfer that would assist tool bit insertion. The conventional bit holder 10 comprises a tool body 26 including a first end portion 18, a second end portion 14, and a hollow interior 22. The first end portion 18 is positioned on one end of the tool body 26, and the second end portion 14 is positioned on another end of the tool body 26 opposite the first end portion 18. A substantially cylindrical exterior of the tool body 26 connects the first end portion to the second end portion. The hollow interior 22 is defined by a non-circular profile (i.e., hexagonal profile) and extends between the first end portion 18 and the second end portion 14.

Figure 2A:
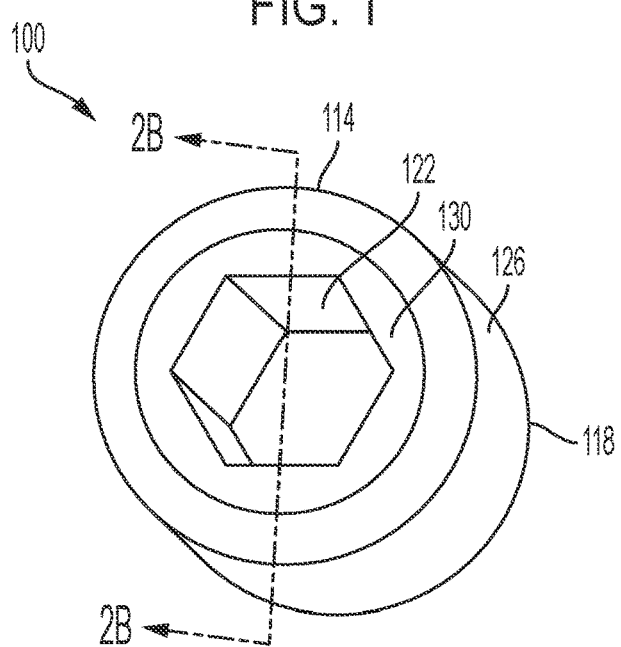
FIG. 2A is a perspective view of another conventional bit holder.
Figure 2B:
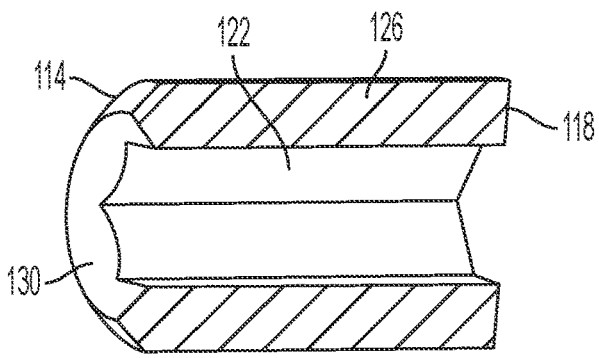
FIG. 2B is a cross-sectional side view of the conventional bit holder take along section line 2B-2B of FIG. 2A.

FIGS. 2A and 2B illustrate another conventional bit holder 100. The bit holder 100 includes a tool body 126 having a first end portion 118, a second end portion 114, and a hollow interior 122. The first end portion 118 is positioned on one end of the tool body 126, and the second end portion 114 is positioned on another end of the tool body 126 opposite the first end portion 118. A substantially cylindrical exterior of the tool body 126 connects the first end portion 118 to the second end portion 114. The hollow interior 122 is defined by a non-circular profile (i.e., hexagonal profile) and extends between the first end portion 118 and the second end portion 114. The illustrated bit holder 100, however, also includes a revolved cut 130 at the second end portion 114. The revolved cut 130 helps center a tool bit as the tool bit is inserted into the bit holder 100, but does not align the tool bit with the non-circular profile of the hollow interior 122.

Figure 3A:
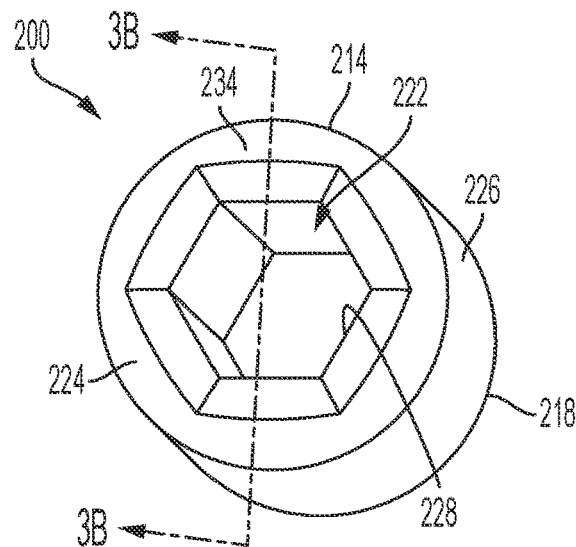
FIG. 3A is a perspective view of a bit holder according to one embodiment of the invention, the bit holder having a chamfer that matches an edge profile of a bore extending through the bit holder.
Figure 3B:
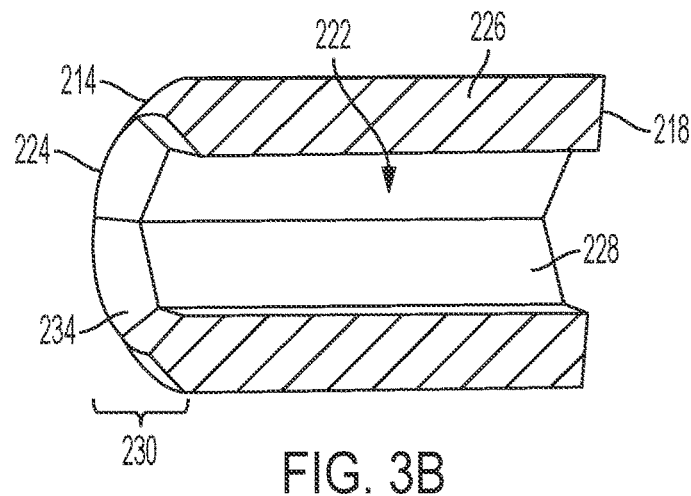
FIG. 3B is a cross-sectional side view of the bit holder take along section line 3B-3B of FIG. 3A.

FIGS. 3A and 3B illustrate a bit holder 200 including a tool body 226 having a first end portion 218, a second end portion 214, and a hollow interior 222. The first end portion 218 is configured to connect to a tool (e.g., a power tool and/or a hand tool). The first end portion 218 may include suitable structures for interfacing with the tool or may be integrally formed with the tool. The second end portion 214 defines an end 224 of the tool body 226 that is opposite the first end portion 218. An outer surface connects the first end portion 218 and the second end portion 214. In the illustrated embodiment, the outer surface is a substantially cylindrical and continuous surface. In other embodiments, the outer surface may have other shapes, and/or the first and second end portions 218, 214 may be discrete sections.

The hollow interior 222 is formed in the tool body 226 and is configured to receive a tool bit (such as one of the tool bits described below). In the illustrated embodiment, the hollow interior 222 is formed in both the first end portion 218 and the second end portion 214 of the tool body 226, but in other embodiments, may be formed in only the second end portion 218. The hollow interior 222 extends through the end 224 of the tool body 226 so that the tool bit can be inserted into the hollow interior 222 through the end 224. The hollow interior 222 is at least partially defined by a non-circular profile. The non-circular profile is formed by an inner surface 228 of the tool body 226. In the illustrated embodiment, the non-circular profile is a hexagonal or hex-shaped profile configured to receive a tool bit having a hexagonal or hex-shaped shank. In other embodiments, the non-circular profile may be other suitable profiles, such as D-shaped, flattened, oblong, triangular, square, octagonal, star-shaped, irregular, and the like.

The illustrated bit holder 200 also includes an alignment region 230 positioned between the end 224 of the tool body 226 and the non-circular profile. The alignment region 230 facilitates aligning the tool bit with the non-circular profile during insertion of the tool bit. The alignment region 230 also partially defines the hollow interior 222. In the illustrated embodiment, the alignment region 230 includes a chamfer 234. Unlike the revolved cut 130 described above with reference to FIGS. 2A and 2B, the illustrated chamfer 234 has a similar profile as the non-circular profile formed in the tool body 226. Specifically, the chamfer 234 includes a hex-shaped profile that helps align (e.g., "clock") a hex-shaped shank of a tool bit with the non-circular profile before the hex-shaped shank reaches the non-circular profile. The tool bit, thereby, can be rapidly inserted into the bit holder 200 without first having to perfectly align the hex-shaped shank with the non-circular profile of the hollow interior 222.

FIGS. 4-13 illustrate another bit holder 300. The bit holder 300 is similar to the bit holder 200 described above, and differences between the bit holder 300 and the bit holder 200 are noted below. The bit holder 300 includes a tool body 326 having a first end portion 318 configured to connect to a tool, a second end portion 314 defining an end 320 of the tool body 326, and a hollow interior 322 partially defined by a non-circular profile. The non-circular profile is formed by an inner surface 338 of the tool body 326.

Figure 4:
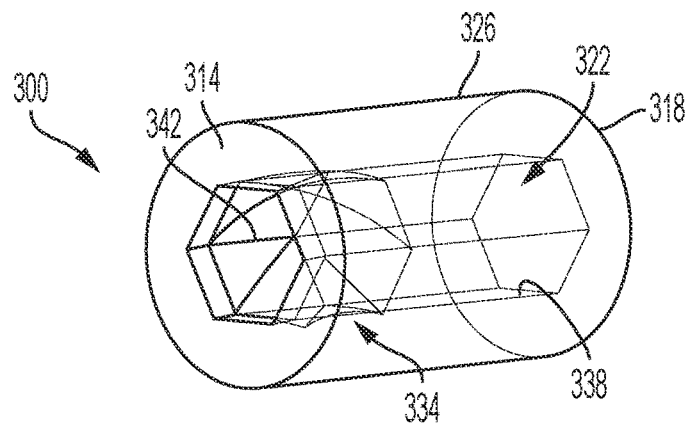
FIG. 4 is a perspective view of a bit holder according to another embodiment of the invention and during an intermediate step of manufacture, the bit holder having a swept profile.

The illustrated bit holder 300 also includes an alignment region 334 (FIGS. 5 and 9) positioned between the end 320 of the tool body 326 and the non-circular profile. In the illustrated embodiment, the alignment region 334 includes a swept profile 342. The swept profile 342 is defined by sweeps that transition into the non-circular profile of the hollow interior 322. FIG. 4 illustrates the bit holder 300 at an intermediate step of manufacture before the sweeps are fully formed in the tool body 326, while FIGS. 5-13 illustrate the finished tool body 326 with the sweeps. The sweeps include grooves and projections that gradually transition from a circular opening to the non-circular profile of the hollow interior 322 to automatically align a tool bit with the non-circular profile. The sweeps gradually project further into the hollow interior 322 to gradually decrease the diameter of the hollow interior 322.

Figure 10:
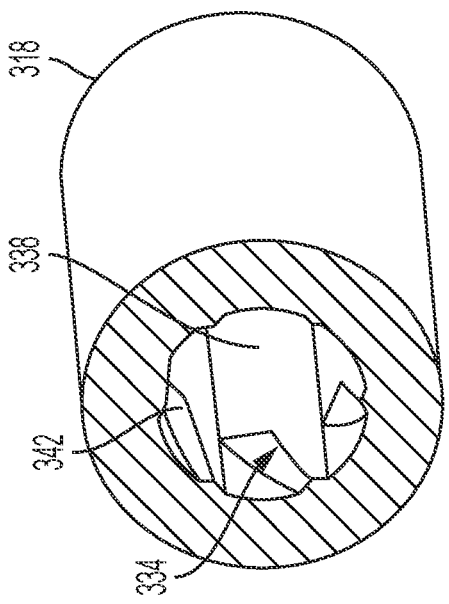
FIG. 10 is a cross-sectional view of the bit holder taken along section line 10-10 of FIG. 8.
Figure 11:
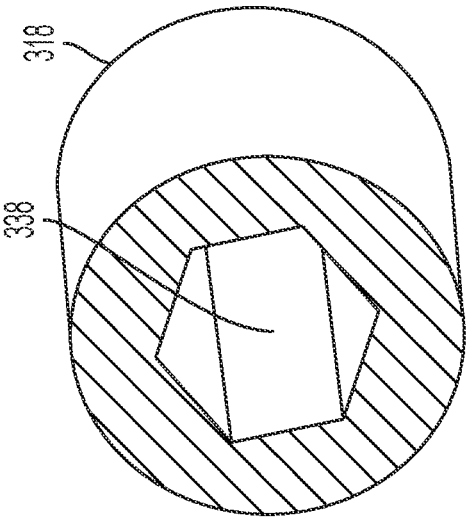
FIG. 11 is a cross-sectional view of the bit holder taken along section line 11-11 of FIG. 8.
Figure 12:
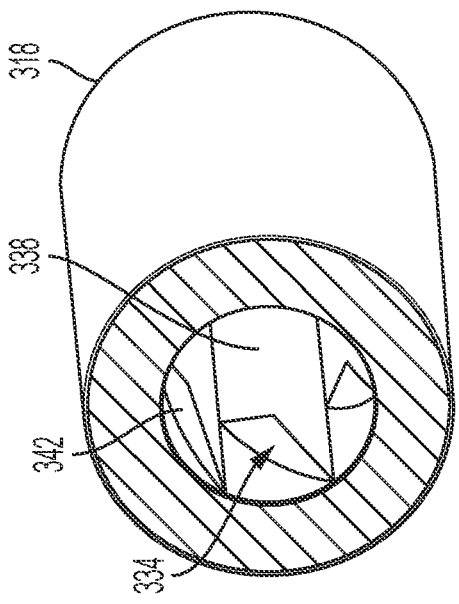
FIG. 12 is a cross-sectional view of the bit holder taken along section line 12-12 of FIG. 8.
Figure 13:
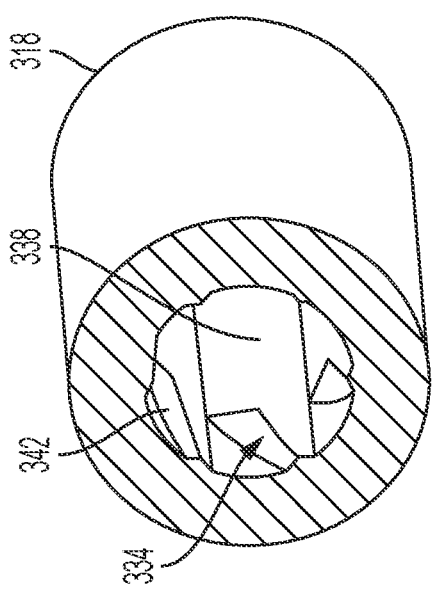
FIG. 13 is a cross-sectional view of the bit holder taken along section line 13-13 of FIG. 8.
Figure 14:
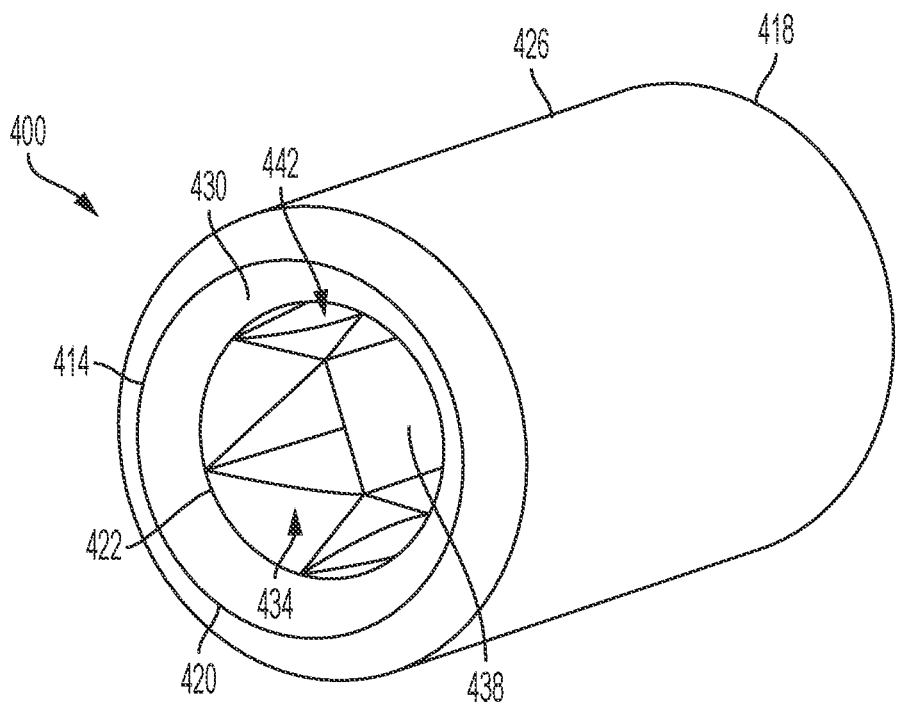
FIG. 14 is a perspective view of a bit holder according to another embodiment of the invention, the bit holder having a swept profile.
Figure 15:
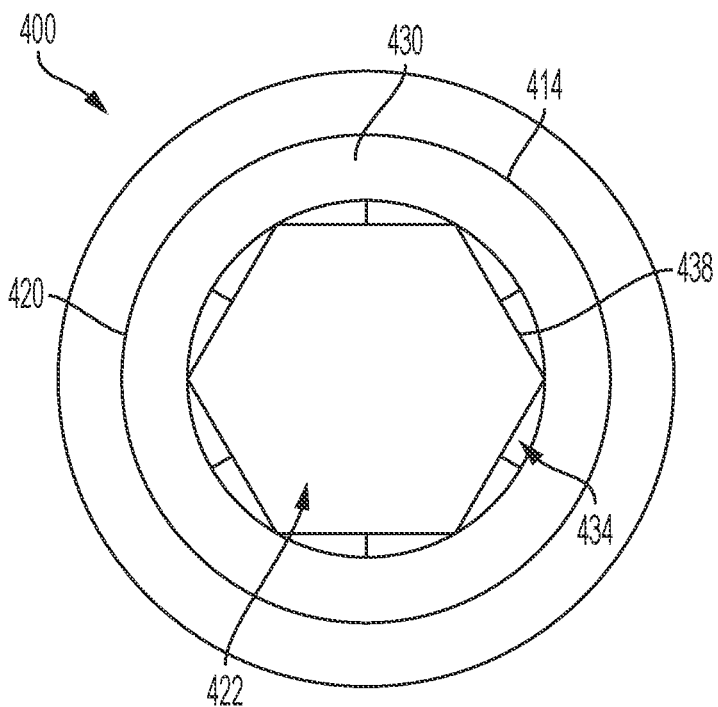
FIG. 15 is a front end view of the bit holder of FIG. 14.
Figure 16:
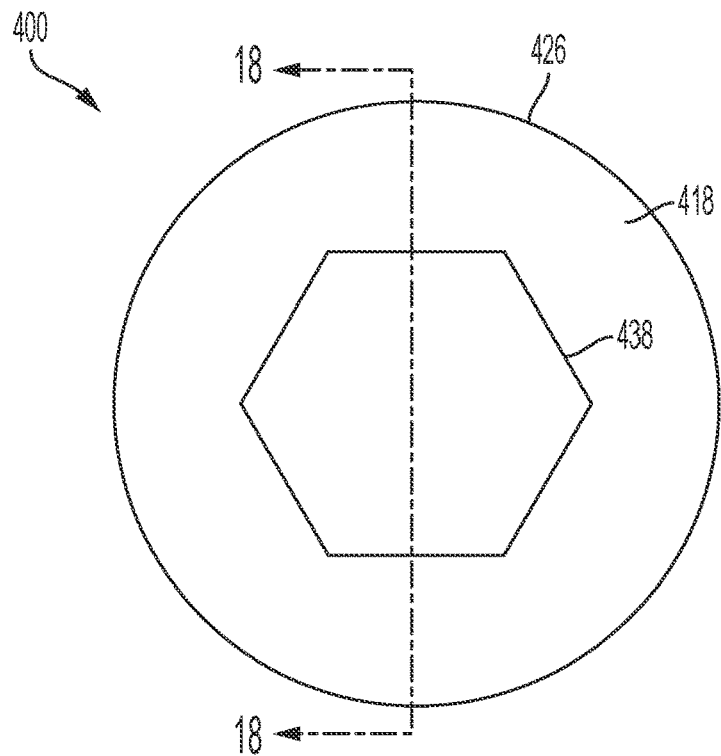
FIG. 16 is a rear end view of the bit holder of FIG. 14.
Figure 17:
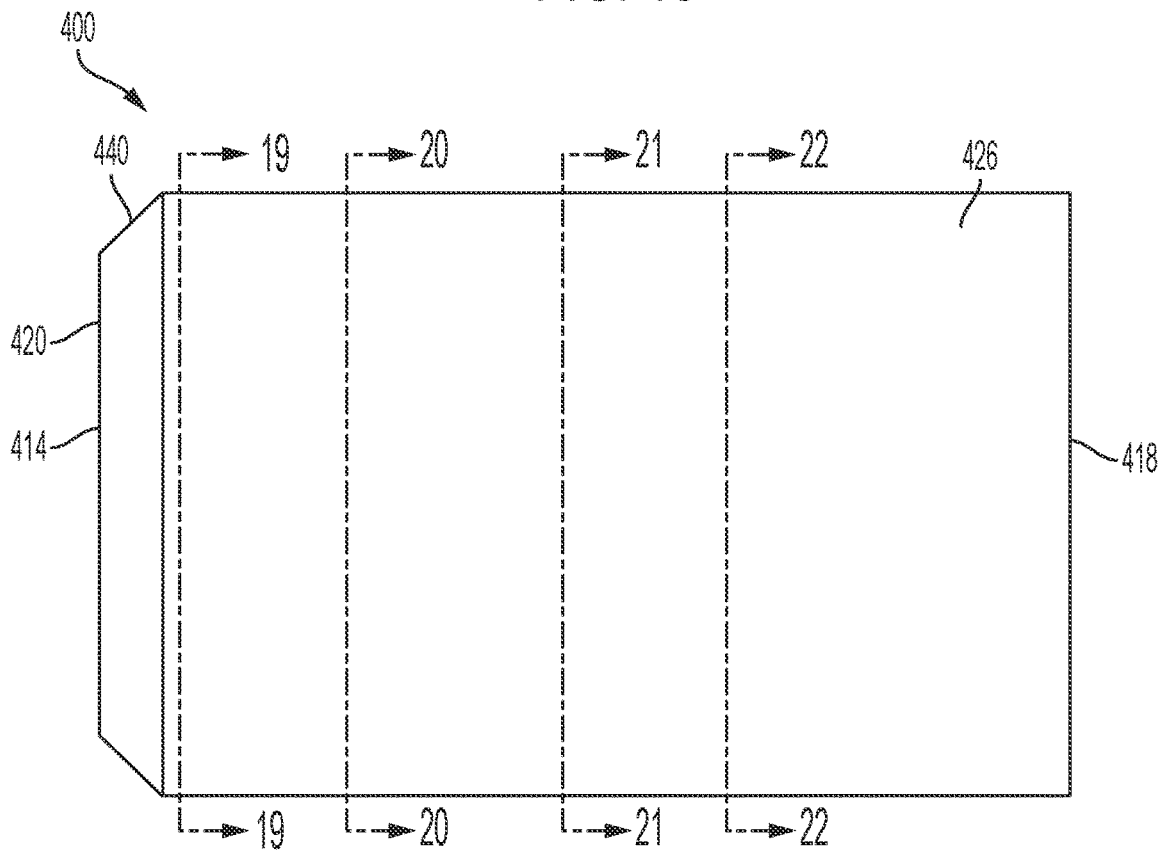
FIG. 17 is a side view of the bit holder of FIG. 14.
Figure 18:
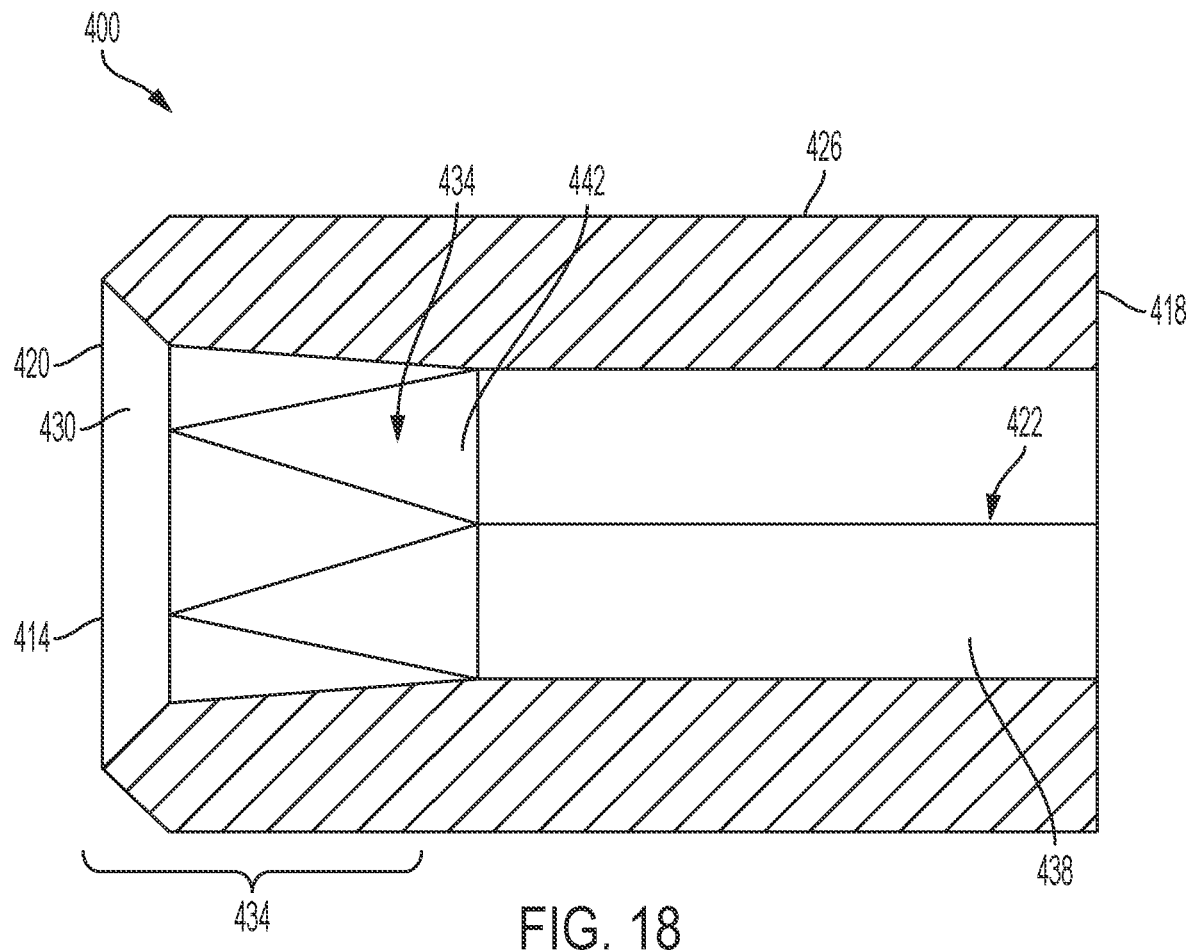
FIG. 18 is a cross-sectional view of the bit holder taken along section line 18-18 of FIG. 16.
Figure 19:
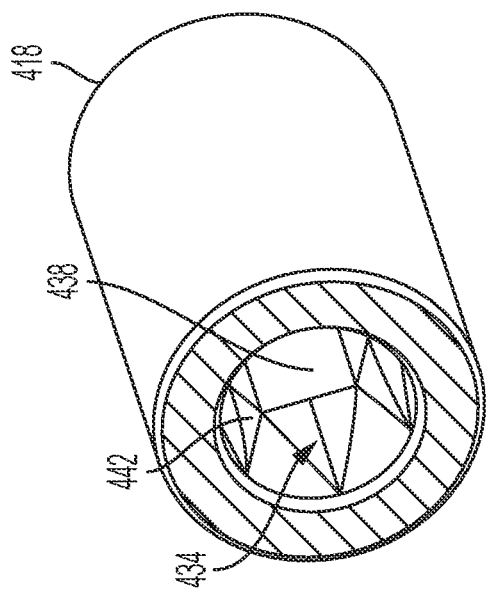
FIG. 19 is a cross-sectional view of the bit holder taken along section line 19-19 of FIG. 17.
Figure 20:
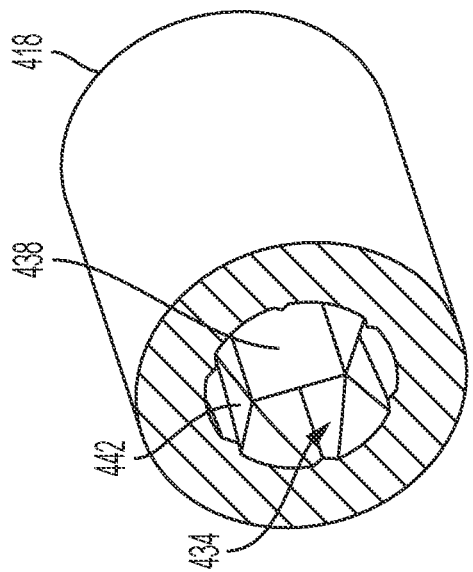
FIG. 20 is a cross-sectional view of the bit holder taken along section line 20-20 of FIG. 17.
Figure 21:
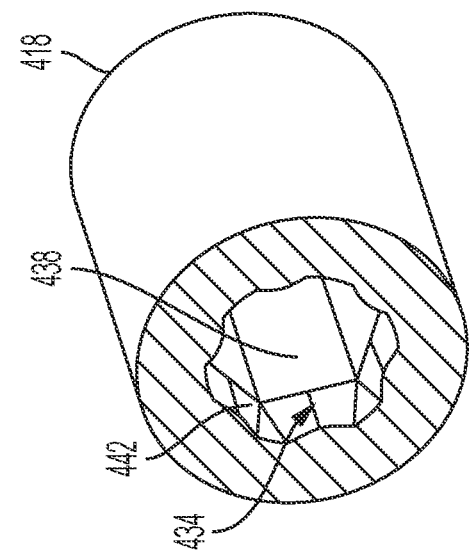
FIG. 21 is a cross-sectional view of the bit holder taken along section line 21-21 of FIG. 17.
Figure 22:
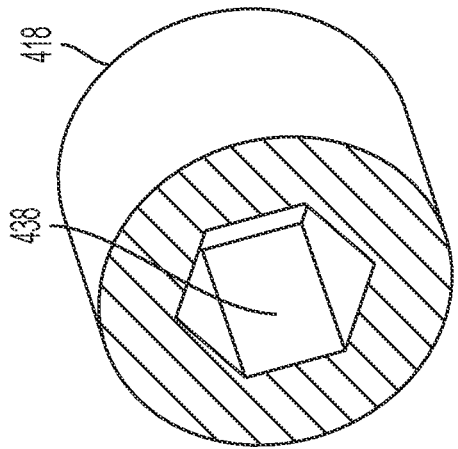
FIG. 22 is a cross-sectional view of the bit holder taken along section line 22-22 of FIG. 17.

FIGS. 10-13 illustrate a series of cross-sections of the bit holder 300. FIGS. 10-12 are cross-sections take along the alignment region 334 at spaced apart planes that are parallel with the end 320 of the tool body 326, while FIG. 13 is a cross-section taken along the hollow interior 322 at the non-circular profile. Each of the cross-sections has a differing geometry, showing the gradual transition from the end 320 of the tool body 326 to the non-circular profile. The swept profile 342 can be scaled with depth, vary in pitch, and/or gradually morph in shape, depending the types of tool bits desired to be received by the bit holder 300.

Referring back to FIG. 9, in the illustrated embodiment, the swept profile 342 is also a rotated profile. More particularly, the tool body 326 defines a central longitudinal axis 346 (FIG. 5) extending through the first end portion 318 and the second end portion 314. The swept profile 342 is rotated about the central longitudinal axis 346 so that each of the sweeps gradually curves into the non-circular profile. Such an arrangement helps automatically rotate a tool bit to align with the non-circular profile of the hollow interior 322 as the tool bit is inserted into the bit holder 300.

Figure 5:
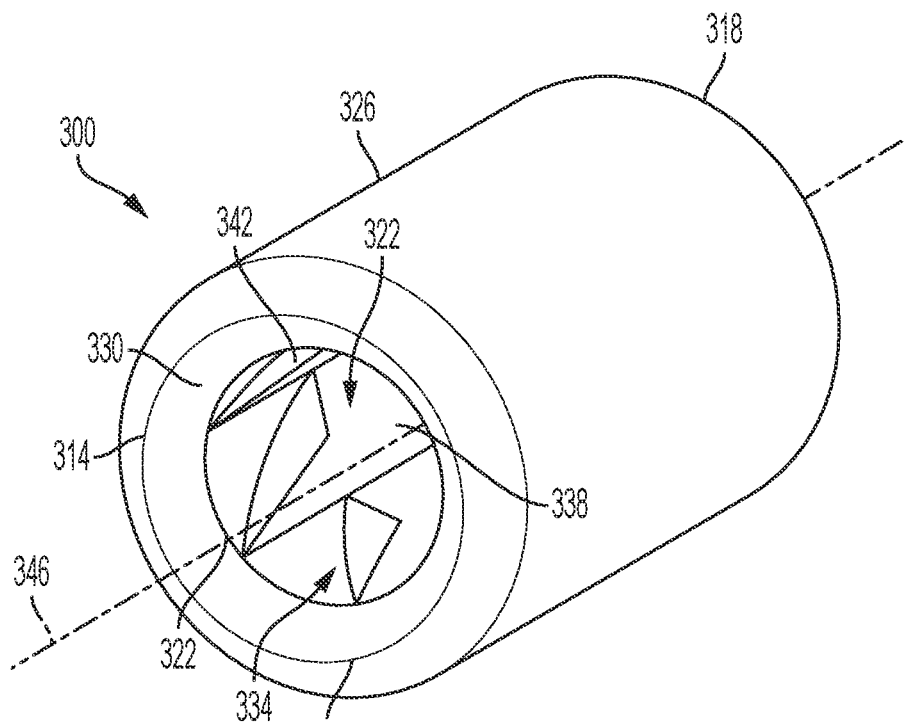
FIG. 5 is a perspective view of the bit holder having the swept profile.
Figure 6:
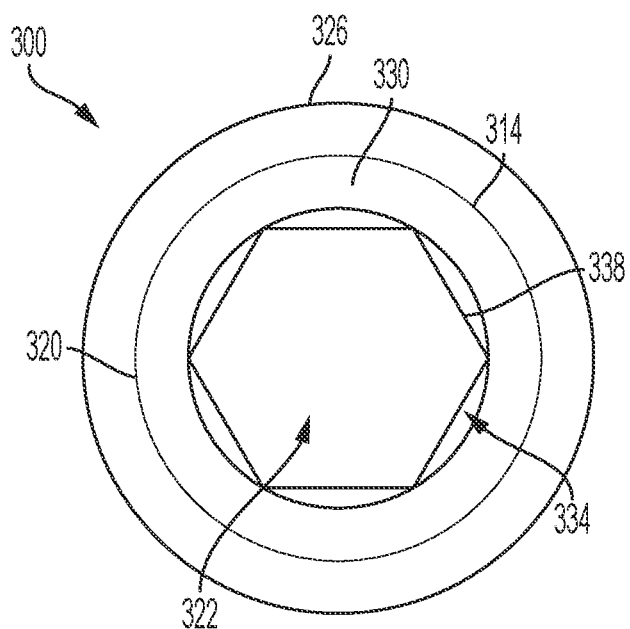
FIG. 6 is a front end view of the bit holder of FIG. 5.
Figure 7:
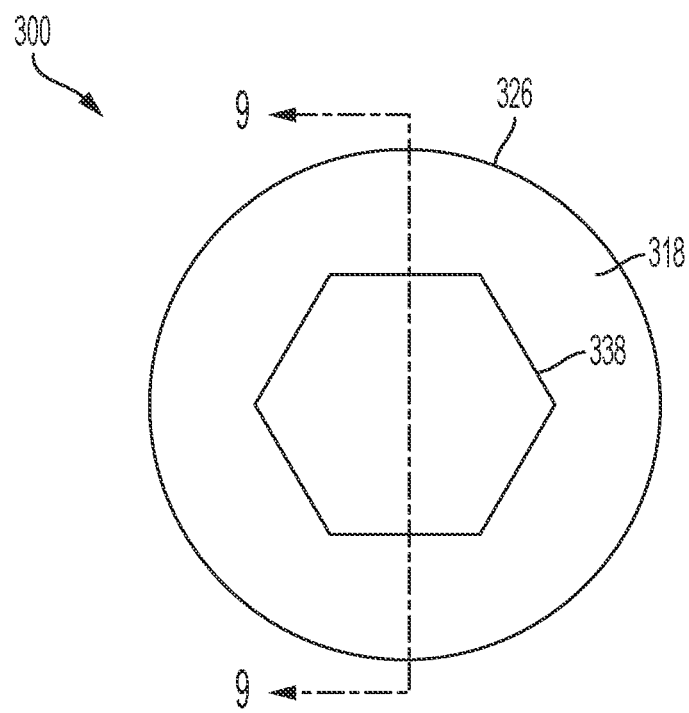
FIG. 7 is a rear end view of the bit holder of FIG. 5.
Figure 8:
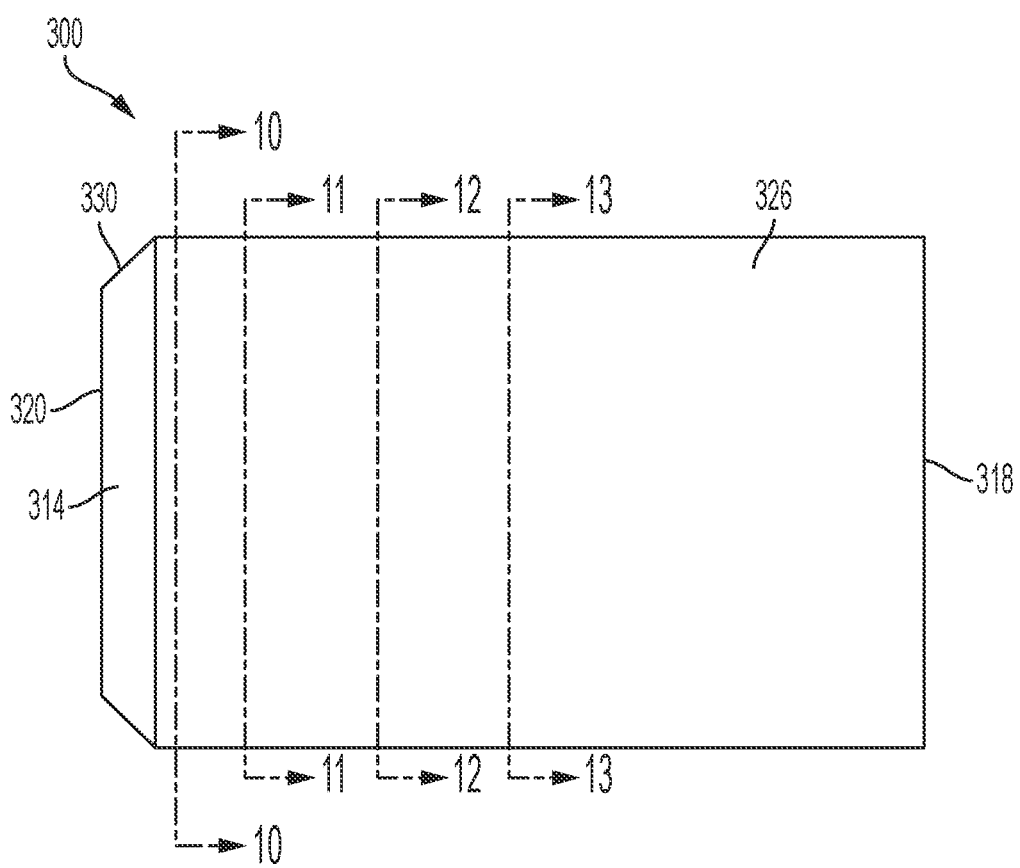
FIG. 8 is a side view of the bit holder of FIG. 5.
Figure 9:
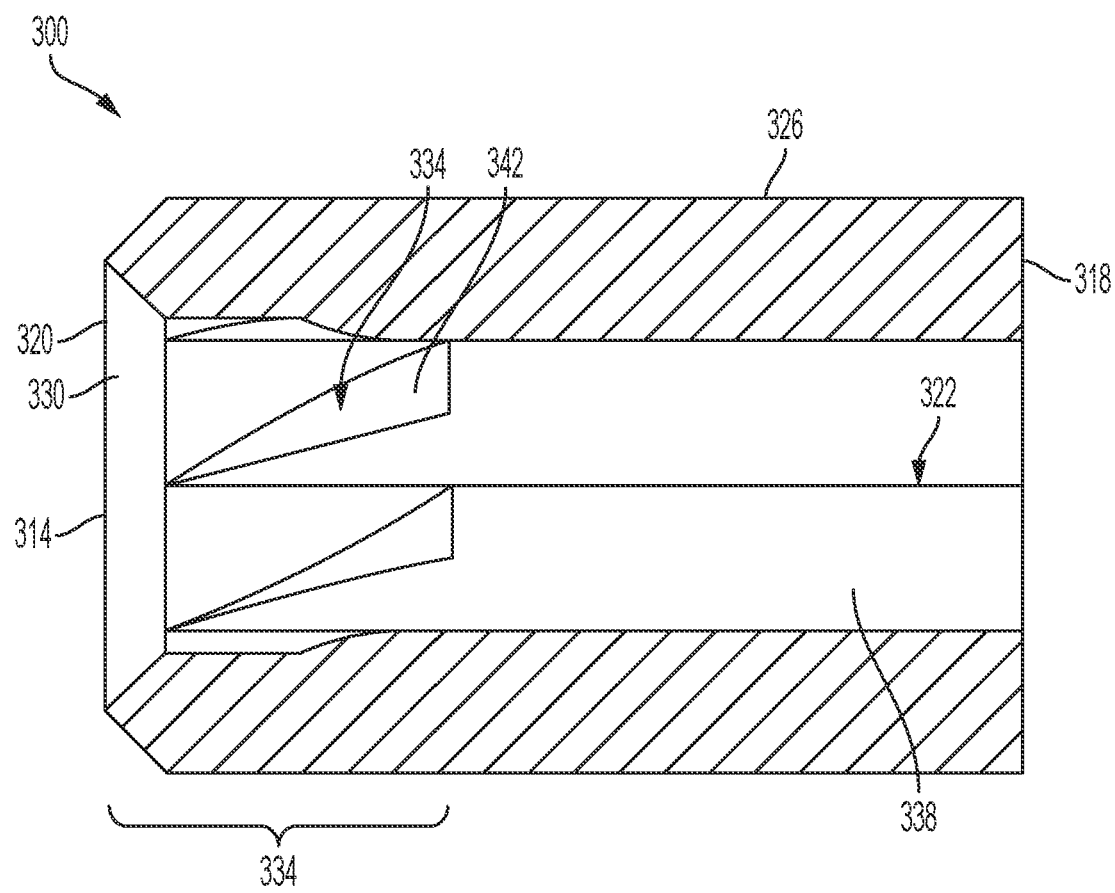
FIG. 9 is a cross-sectional view of the bit holder taken along section line 9-9 of FIG. 7.

As shown in FIGS. 5 and 9, the illustrated alignment region 334 also includes a chamfer 330. The chamfer 330 extends from the end 320 of the tool body 326 to the swept profile 342. In the illustrated embodiment, the chamfer 330 has a circular profile that gradually decreases in diameter from the end 320 of the tool body 326 to the swept profile 334. In other embodiments, the chamfer 330 may have a non-circular profile, similar to the chamfer 230 described above with reference to FIGS. 3A and 3B.

In use, a tool bit may be inserted into a bit holder 300 in any orientation (i.e., in any rotation orientation about the tool bit's longitudinal axis, but still with the proper end of the tool bit being inserted into the bit holder 300). The chamfer 330, with a larger diameter at the end 320 of the tool body 326, helps initially insert the tool bit into the tool body 326. As the tool bit is inserted into the tool body 326, an outer surface of the tool bit engages the swept profile 342. As the tool bit is further inserted into the tool body 326, the swept profile 342 automatically rotates (e.g., "clocks") the tool bit so the tool bit properly aligns with the non-circular profile of the hollow interior 322. Once the tool bit is fully inserted into the bit holder 300, the tool bit may be operated (e.g., rotated) by the bit holder 300 for use.

FIGS. 14-22 illustrate another bit holder 400. The bit holder 400 is similar to the bit holders 200, 300 described above, and differences between the bit holder 400 and the bit holders 200, 300 are noted below. The bit holder 400 includes a tool body 426 having a first end portion 418 configured to connect to a tool, a second end portion 414 defining an end 420 of the tool body 426, and a hollow interior 422 partially defined by a non-circular profile. The non-circular profile is formed by an inner surface 438 of the tool body 426.

Similar to the bit holder 300, the illustrated bit holder 400 also includes an alignment region 434 (FIGS. 14 and 18) having a swept profile 442 and a chamfer 430. Unlike the bit holder 300, however, the illustrated swept profile 442 is not rotated about a central longitudinal axis of the tool body 426.

Figure 23A:
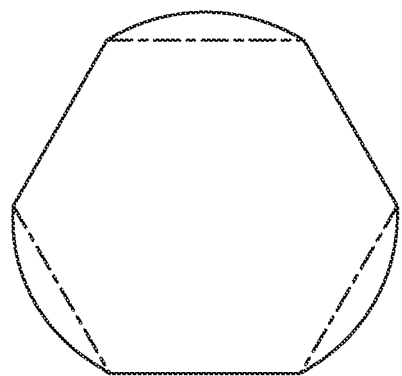
FIG. 23A is a schematic end view of an alternative swept profile.
Figure 23B:
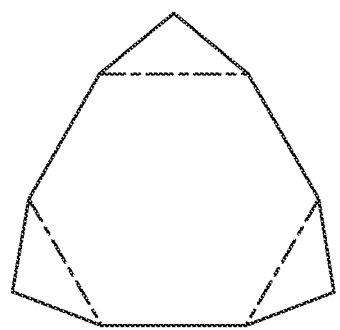
FIG. 23B is a schematic end view of another alternative swept profile.

In some embodiments, the swept profiles 334, 434 of the tool bits 300, 400 could be slight variations of the original shapes that would engage at least one edge, surface, or corner of a tool bit. For instance, FIGS. 23A and 23B illustrate hex profiles that are modified to only engage three edges or corners of a hex-shaped shank of a tool bit.

Figure 24:
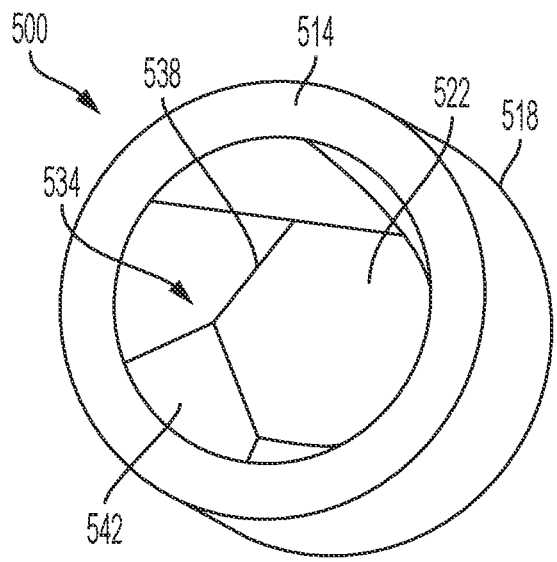
FIG. 24 is a perspective view of a bit holder according to another embodiment of the invention.

FIG. 24 illustrates part of another bit holder 500. The bit holder 500 is similar to the bit holder 200, 300 described above, and differences between the bit holder 500 and the bit holders 200, 300 are noted below. The illustrated bit holder 500 includes an alignment region 534 having a swept profile 542. The illustrated swept profile 542 allows for less than a full rotational degree of symmetry for a hex-shaped bit to be inserted into the bit holder 500. In the illustrated embodiment, the swept profile 542 has a twelfth of a degree of turn about a central longitudinal axis of the bit holder 500. In other embodiments, any degree of turn may be used that mitigates alignment challenges, even if not all alignment challenges are fully resolved. Furthermore, the illustrated bit holder accounts for imperfect rotational sweeps in the swept profile 542, such as lofts.

Figure 25:
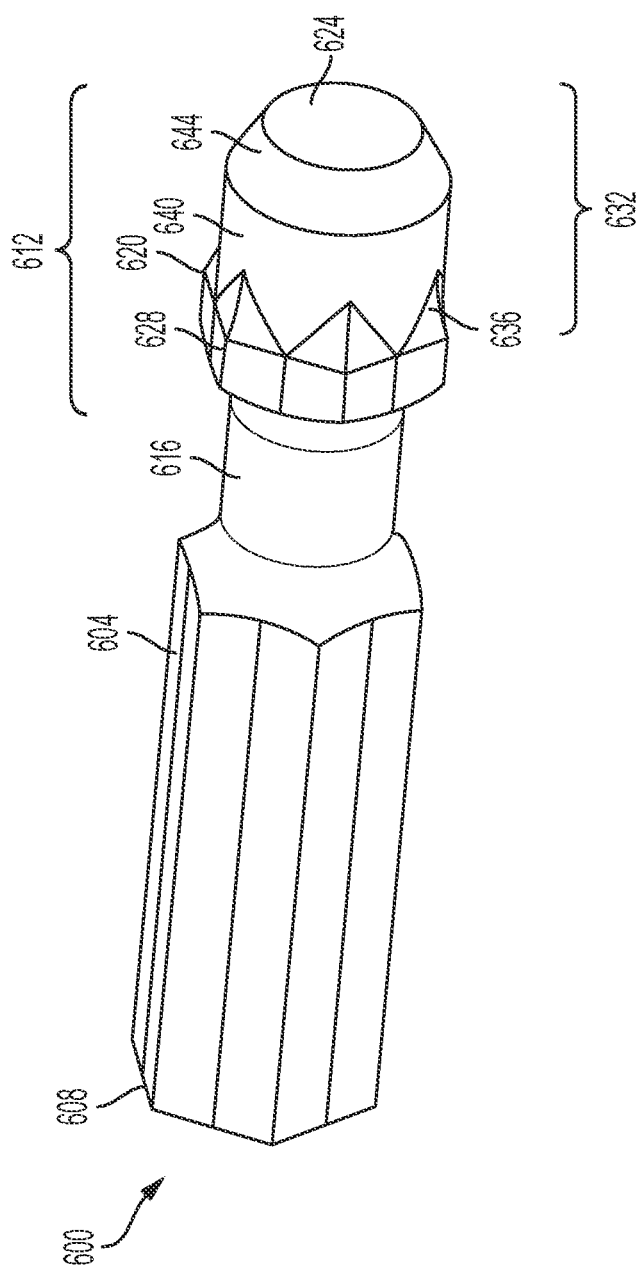
FIG. 25 is a perspective view of a tool bit according to an embodiment of the invention.

FIG. 25 illustrates a tool bit 600 for use with, for example, a conventional bit holder (as shown in FIGS. 1-2B) or a bit holder with an alignment region (as shown in FIGS. 3A-24). The illustrated tool bit 600 includes a tool body 604 having a working end portion 608, an insertion end portion 612, a connecting portion 616 extending between the working end portion 608 and the insertion end portion 612, and an outer surface 620 formed on the insertion end portion 612. Although only illustrated as unformed bar stock throughout the drawings, the working end portion 608 can be formed (e.g., machined, cut, milled, molded, forged, etc.) into any suitable tool implement suitable for doing work, such as a screwdriver head or a drill bit.

The insertion end portion 612 is configured to be connected to a tool (e.g., a power tool and/or a hand tool). More particularly, the insertion end portion 612 is configured to be inserted into and received by a bit holder, chuck, or other structure coupled to or part of the tool. For ease of discussion, all of these types of structures will be referred to as bit holders herein. The insertion end portion 612 defines an end 624 of the tool body 604 that is opposite the working end portion 608.

The connection portion 616 is positioned between the working end portion 608 and the insertion end portion 612. The connecting portion 616 has a reduced diameter compared to the working end and insertion end portions 608, 612. Such an arrangement allows the connecting portion 616 to receive a release mechanism of a bit holder, such as a ball bearing, to releasably secure the tool bit 600 to the bit holder.

The outer surface 620 on the insertion end portion 612 of the tool bit 600 is partially defined by a non-circular profile 628. The non-circular profile 628 is adjacent the connecting portion 616 of the tool body 604. In the illustrated embodiment, the non-circular profile 628 is a hexagonal or hex-shaped profile configured to be received in a hexagonal or hex-shaped bit holder. In other embodiments, the non-circular profile 628 may be other suitable profiles, such as D-shaped, flattened, oblong, triangular, square, octagonal, star-shaped, irregular, and the like.

The outer surface 620 on the insertion end portion 612 also includes an alignment region 632 positioned between the end 624 of the tool body 604 and the non-circular profile 628. The alignment region 632 facilitates aligning the non-circular profile 628 with a similar non-circular profile in a bit holder during insertion of the tool bit 600. In the illustrated embodiment, the alignment region 632 includes a swept profile 636 and a first or circular profile 640. The swept profile 636 is positioned between the non-circular profile 628 and the circular profile 640. The circular profile 640 is positioned between the end 624 of the tool body 604 and the swept profile 636. The swept profile 636 is defined by sweeps that transition into the non-circular profile 628. More particularly, the sweeps include projections that gradually transition from the circular profile 640 to the non-circular profile 628 to automatically align the tool bit 600 with a bit holder. The sweeps gradually widen and project further outward from the circular profile 640 as the sweeps approach the non-circular profile 628 to eventually match the shape of the non-circular profile 628.

The illustrated alignment region 632 also includes a chamfer 644. The chamfer 644 extends from the end 624 of the tool body 604 to the circular profile 640. In the illustrated embodiment, the chamfer 640 has a circular profile that gradually increases in diameter from the end 624 of the tool body 604 to the circular profile 640. In other embodiments, the chamfer 644 may have a non-circular profile, such as a hex-shaped profile. In further embodiments, the chamfer 644 may be omitted.

In use, the tool bit 600 may be inserted into a bit holder in any orientation (i.e., in any rotational orientation about the tool bit's longitudinal axis, but still with the insertion end portion 612 being inserted into the bit holder first). The chamfer 644 helps initially insert the insertion end portion 612 into the bit holder. As the tool bit 600 is inserted into the bit holder, the swept profile 636 engages an inner surface of the bit holder. As the tool bit 600 is further inserted into the bit holder, the swept profile 636 automatically rotates (e.g., "clocks") the tool bit 600 so the tool bit 600 properly aligns with a non-circular (e.g., hex-shaped) profile inside the bit holder. Once the tool bit 600 is fully inserted into the bit holder, the tool bit 600 may be operated (e.g., rotated) by the bit holder and associated tool for use.

Figure 26:
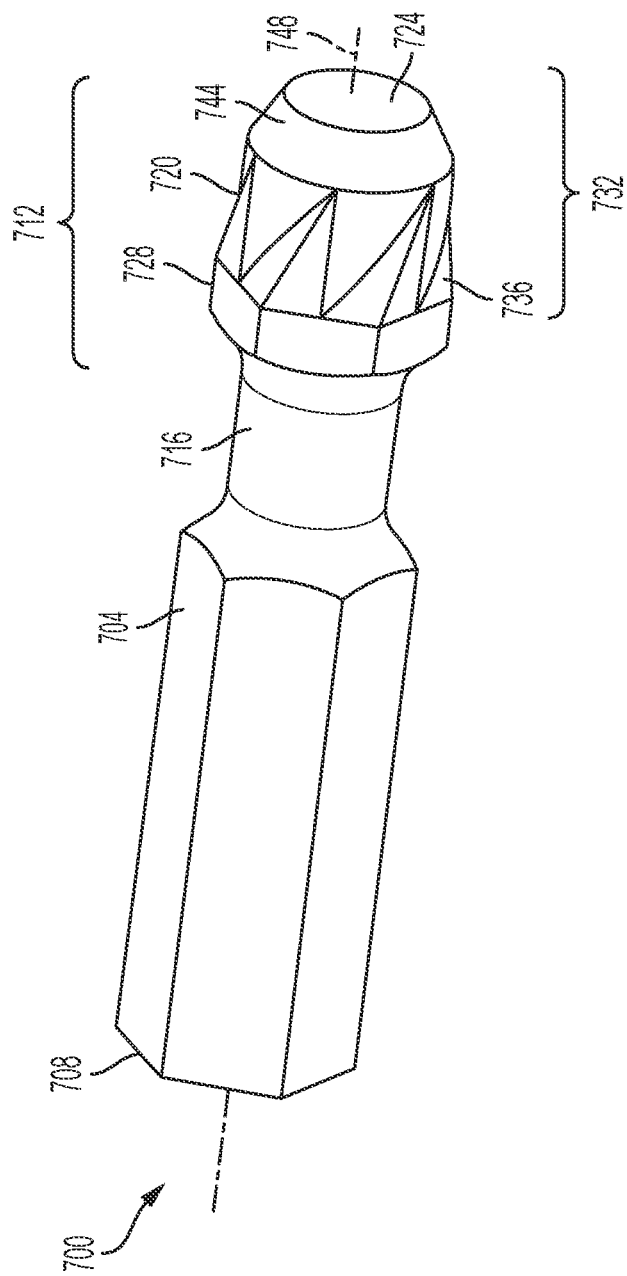
FIG. 26 is a perspective view of a tool bit according to another embodiment of the invention.
Figure 27:
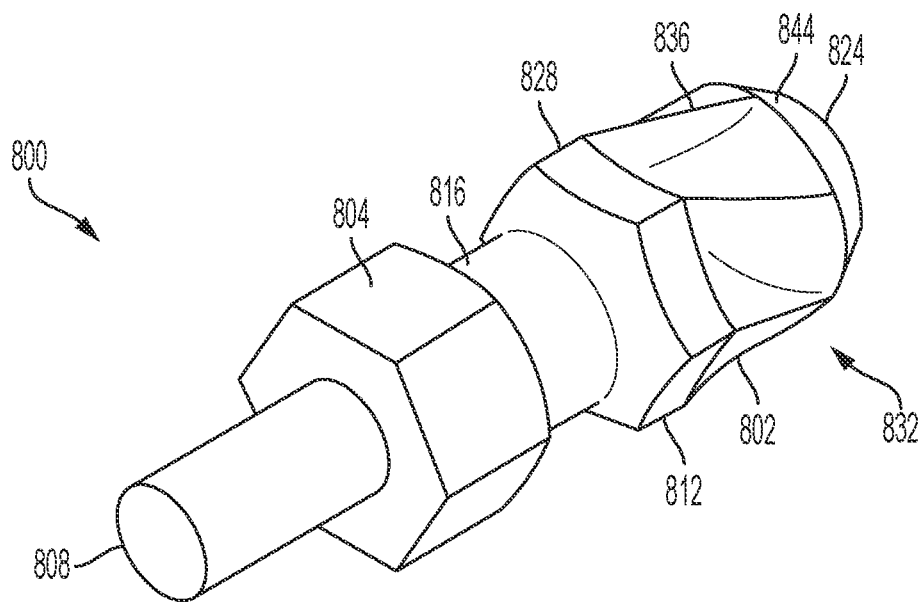
FIG. 27 is a perspective view of a tool bit according another embodiment of the invention.
Figure 28:
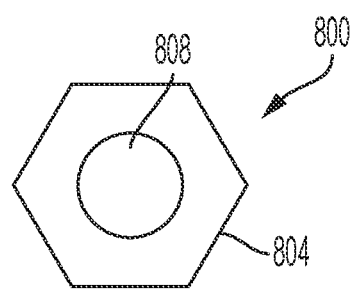
FIG. 28 is a front end view of the tool bit of FIG. 27.
Figure 29:
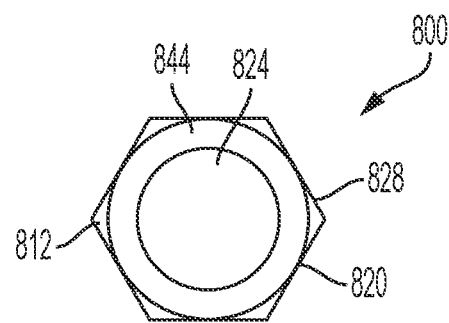
FIG. 29 is a rear end view of the tool bit of FIG. 27.
Figure 32:
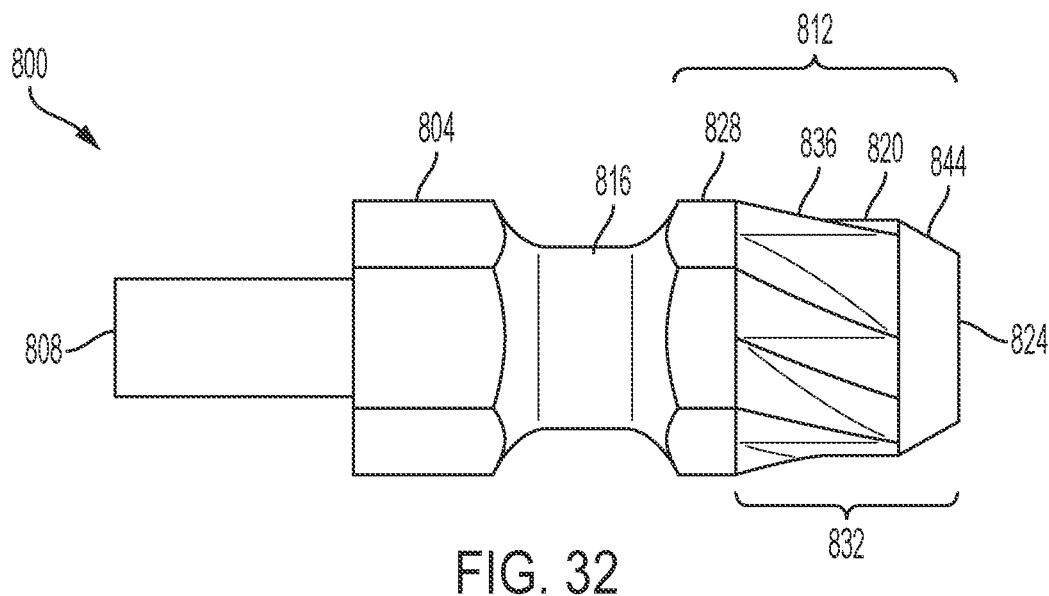
FIG. 32 is a third side view of the tool bit of FIG. 27.
Figure 33:
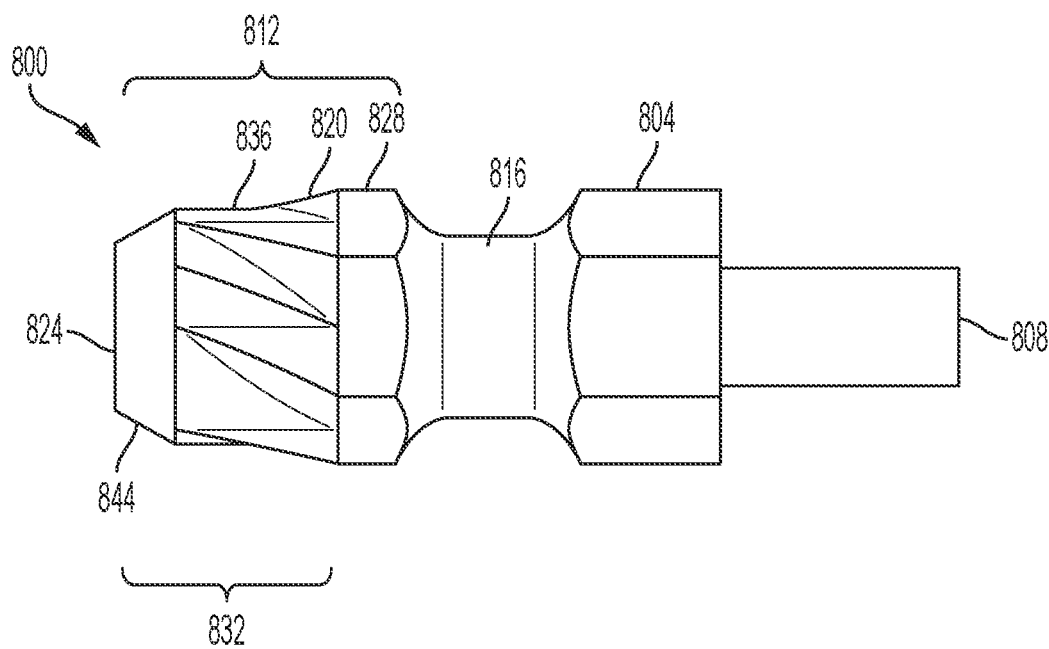
FIG. 33 is a fourth side view of the tool bit of FIG. 27.
Figure 34:
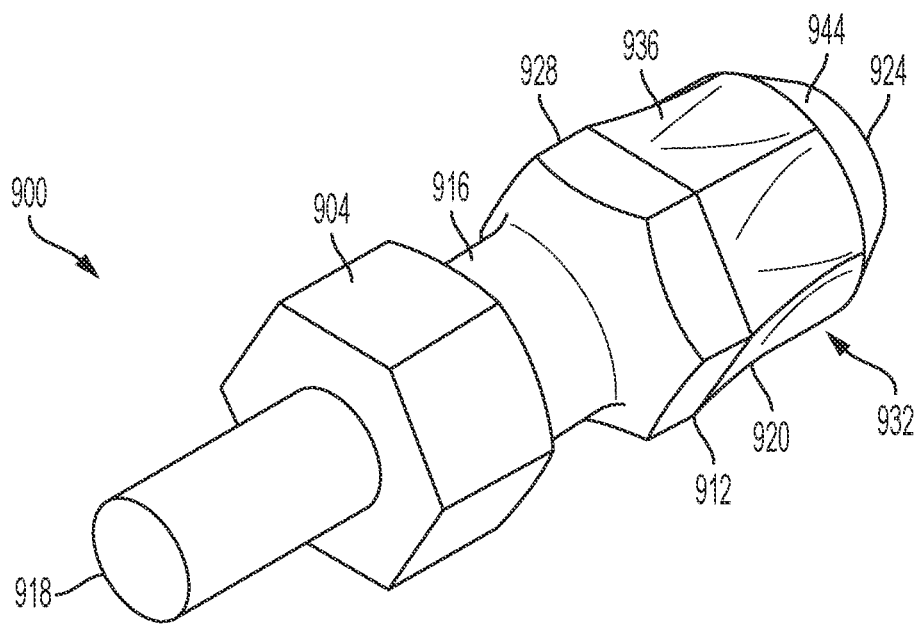
FIG. 34 is a perspective view of a tool bit according to another embodiment of the invention
Figure 35:
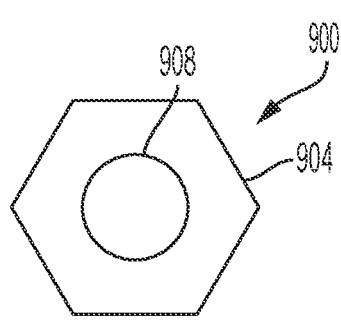
FIG. 35 is a front end view of the tool bit of FIG. 34.
Figure 36:
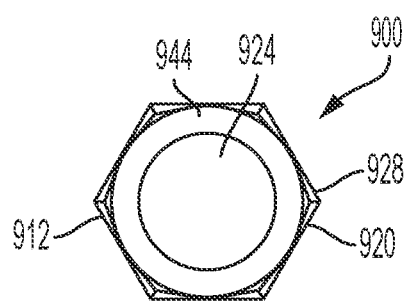
FIG. 36 is a rear end view of the tool bit of FIG. 34.
Figure 37:
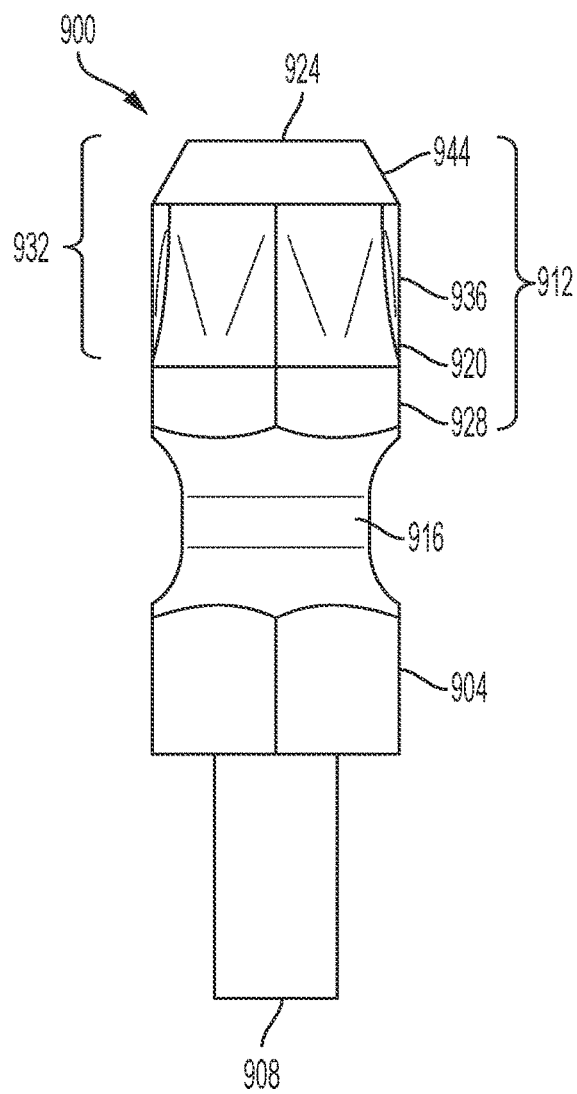
FIG. 37 is a first side view of the tool bit of FIG. 34.
Figure 38:
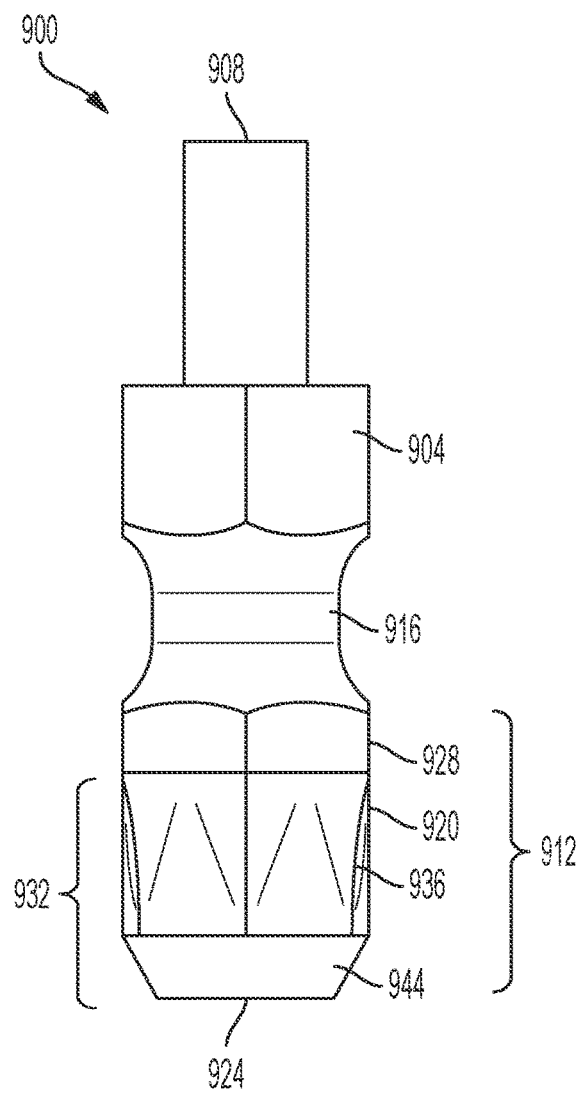
FIG. 38 is a second side view of the tool bit of FIG. 34.
Figure 39:
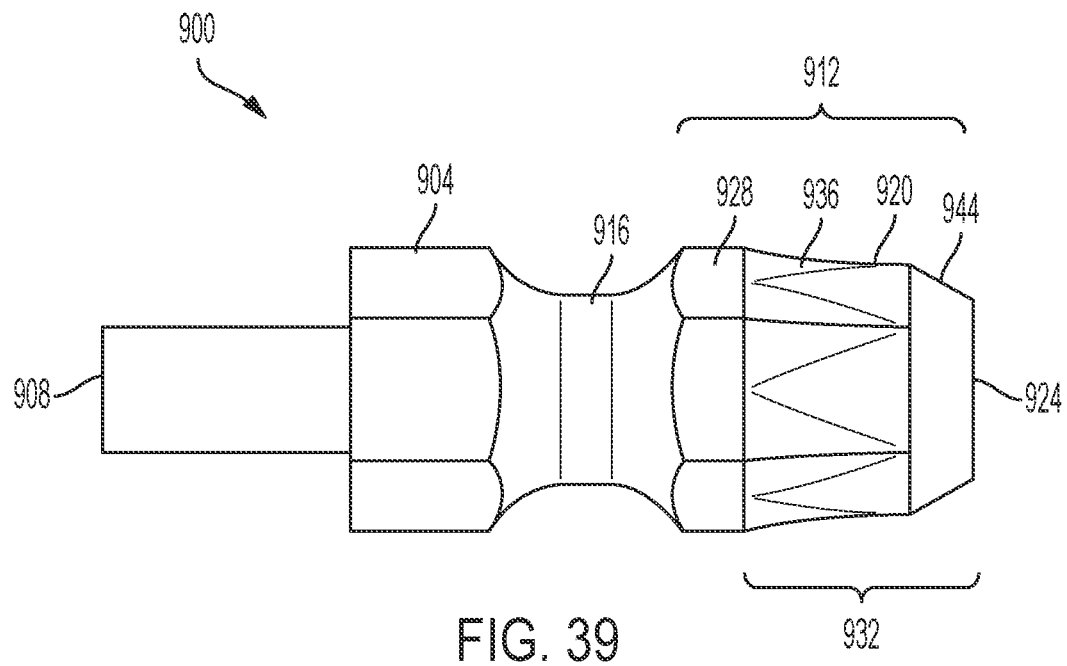
FIG. 39 is a third side view of the tool bit of FIG. 34.
Figure 40:
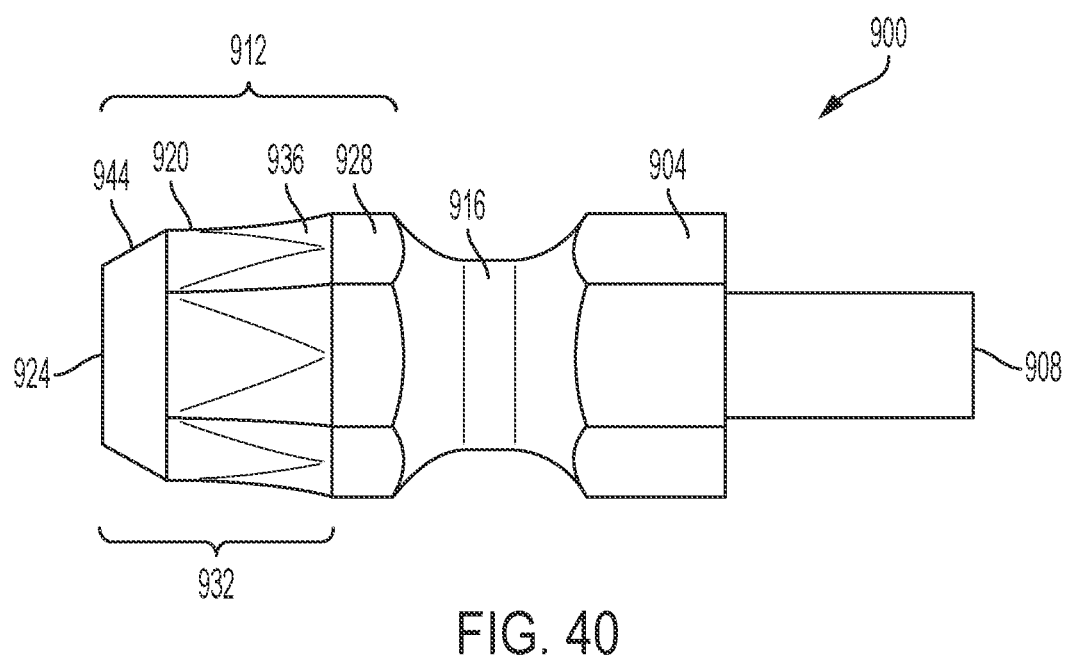
FIG. 40 is a fourth side view of the tool bit of FIG. 34.

FIG. 26 illustrates another tool bit 700. The tool bit 700 is similar to the tool bit 600 described above, and differences between the tool bit 700 and the tool bit 600 are noted below. The tool bit 700 includes a tool body 704 having a working end portion 708, an insertion end portion 712, a connecting portion 716, and an outer surface 720 formed on the insertion end portion 712. The insertion end portion 712 defines an end 724 of the tool body 704 that is opposite the working end portion 708.

The outer surface 720 on the insertion end portion 712 is partially defined by a non-circular profile 728 and is partially defined by an alignment region 732. The illustrated alignment region 732 includes a swept profile 736 and a chamfer 744. The swept profile 736 is relatively longer than the swept profile 636 shown in FIG. 25 such that the swept profile 736 extends from the chamfer 744 to the non-circular profile 728.

In addition, the illustrated swept profile 736 is also a rotated profile. More particularly, the tool body 704 defines a central longitudinal axis 748 extending through the working end portion 708, the connecting portion 716, and the insertion end portion 712. The swept profile 736 is rotated about the central longitudinal axis 748 so that each of the sweeps gradually curves into the non-circular profile 728. Such an arrangement helps automatically rotate the tool bit 700 to align with a non-circular profile inside a bit holder as the tool bit 700 is inserted into the bit holder.

FIGS. 27-33 illustrate another tool bit 800. The tool bit 800 is similar to the tool bits 600, 700 described above, and differences between the tool bit 800 and the tool bits 600, 700 are noted below. The tool bit 800 includes a tool body 804 having a working end portion 808, an insertion end portion 812, a connecting portion 816, and an outer surface 820 formed on the insertion end portion 812. The insertion end portion 812 defines an end 824 of the tool body 804 that is opposite the working end portion 808.

The outer surface 820 of the insertion end portion 812 is partially defined by a non-circular profile 828 and is partially defined by an alignment region 832. The illustrated alignment region 832 includes a swept profile 836 and a chamfer 844. The swept profile 836 is similar to the swept profile 736 shown in FIG. 26, but has a different overall shape.

FIGS. 34-40 illustrate another tool bit 900. The tool bit 900 is similar to the tool bits 600, 700 described above, and differences between the tool bit 900 and the tool bits 600, 700 are noted below. The tool bit 900 includes a tool body 904 having a working end portion 908, an insertion end portion 912, a connecting portion 916, and an outer surface 920 formed on the insertion end portion 912. The insertion end portion 912 defines an end 924 of the tool body 904 that is opposite the working end portion 908.

The outer surface 920 of the insertion end portion 912 is partially defined by a non-circular profile 928 and is partially defined by an alignment region 932. The illustrated alignment region 932 includes a swept profile 936 and a chamfer 944. The swept profile 936 is similar to the swept profile 736 shown in FIG. 26, but has a different overall shape.

Figure 41A:
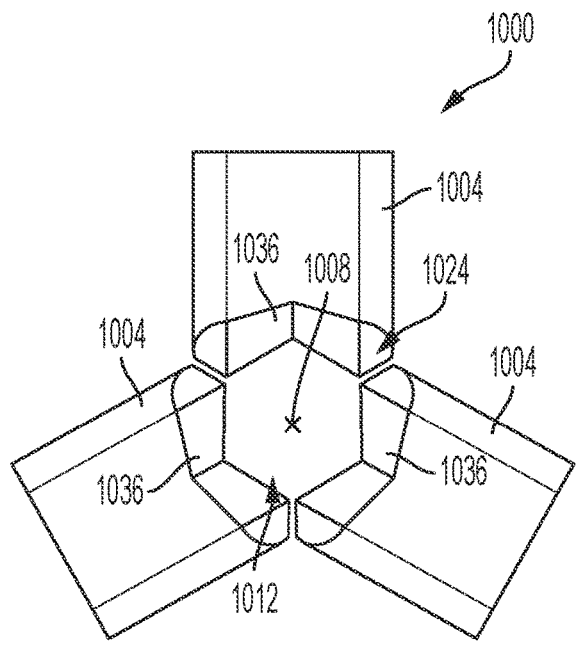
FIG. 41A is an end view of a chuck including a plurality of jaws according to an embodiment of the invention.
Figure 41B:
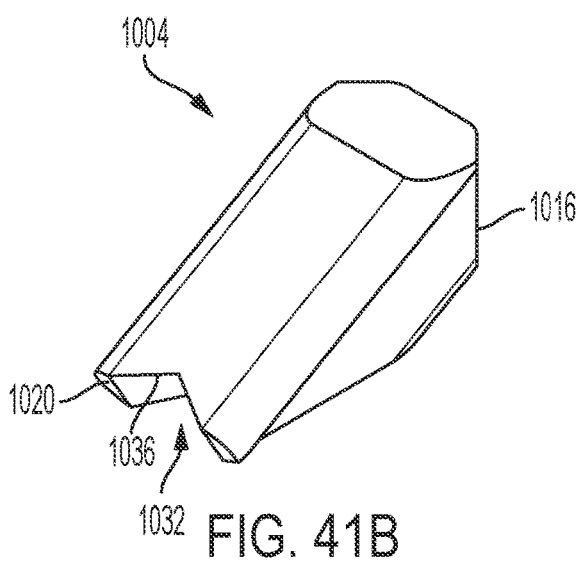
FIG. 41B is a perspective view of one of the jaws of FIG. 41A, the jaw including a chamfer.
Figure 42:
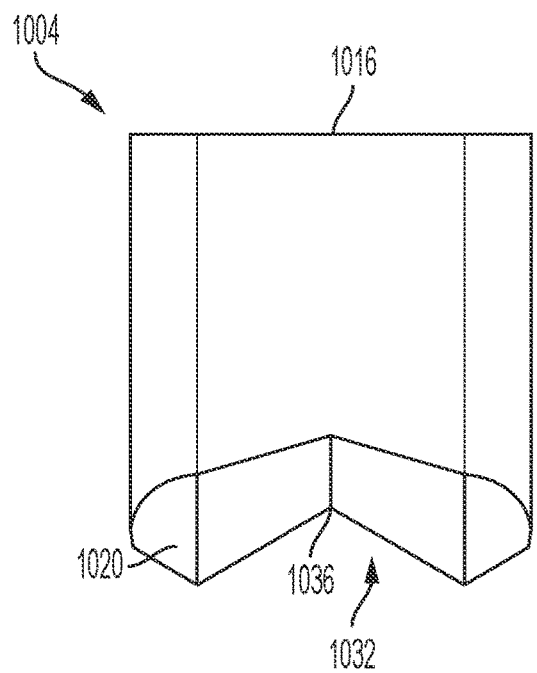
FIG. 42 is a front view of the jaw of FIG. 41B.
Figure 43:
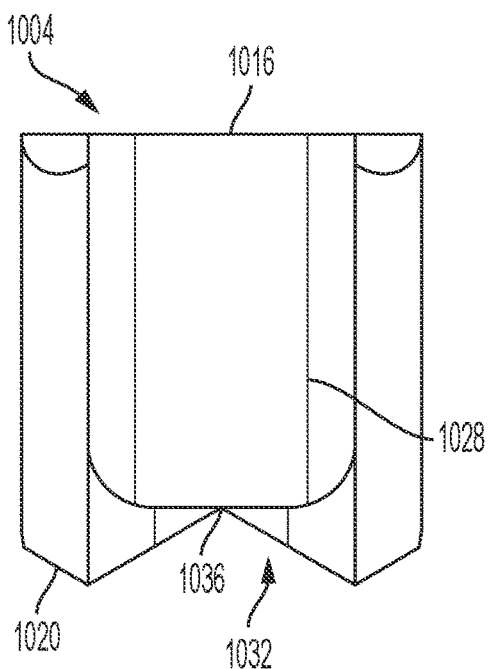
FIG. 43 is a rear view of the jaw of FIG. 41B.
Figure 44:
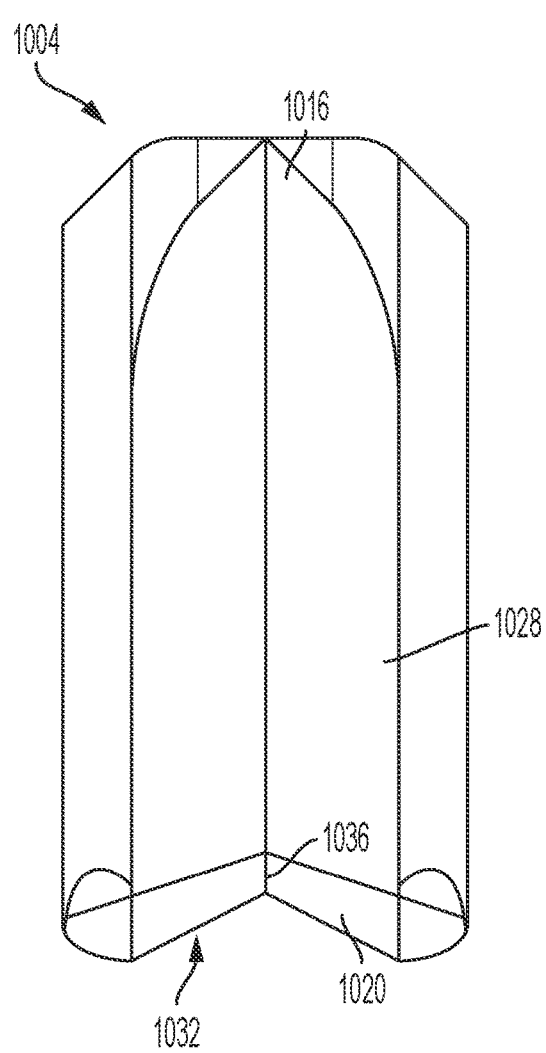
FIG. 44 is a bottom view of the jaw of FIG. 41B.
Figure 45:
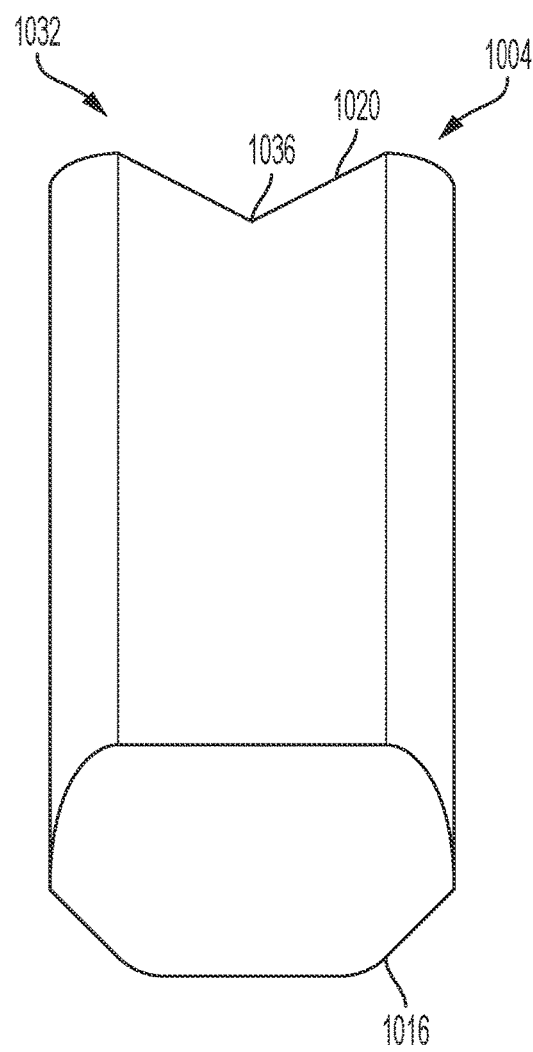
FIG. 45 is a top view of the jaw of FIG. 41B.
Figure 46:
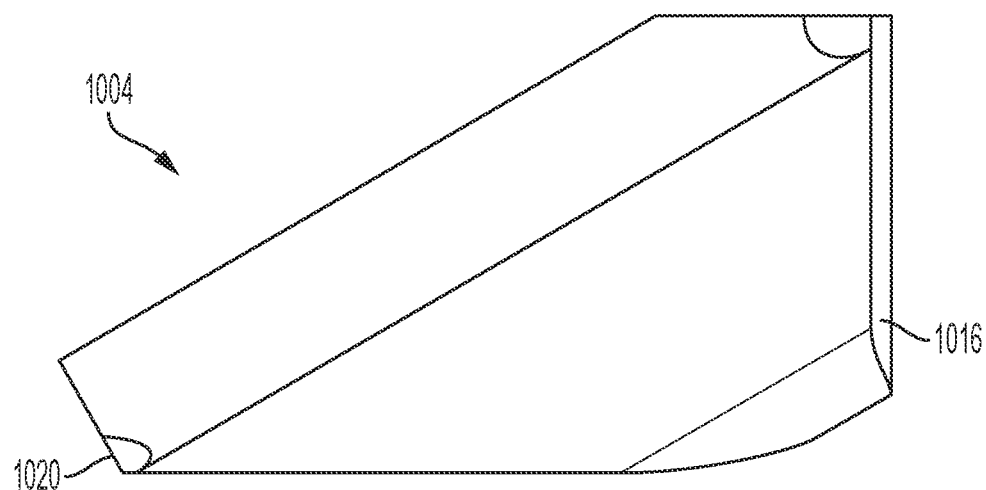
FIG. 46 is a first side view of the jaw of FIG. 41B.
Figure 47:
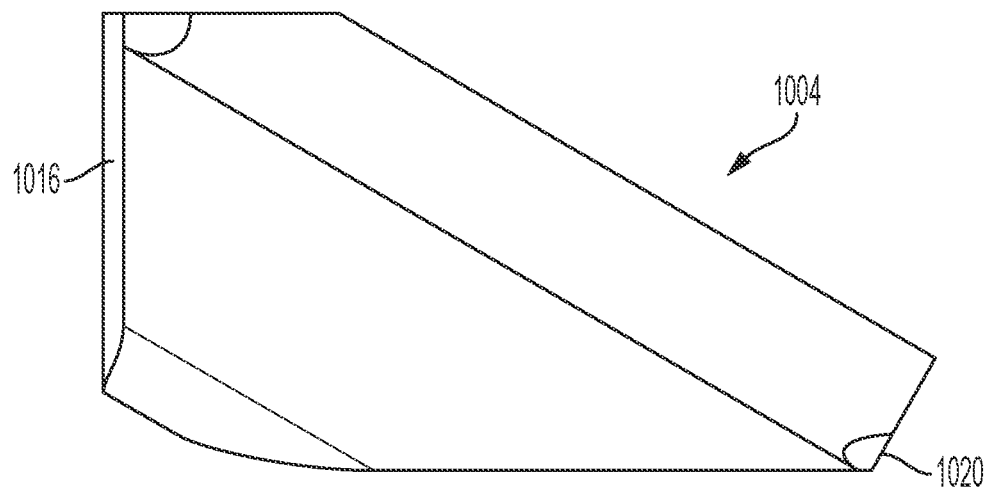
FIG. 47 is a second side view of the jaw of FIG. 41B.

FIG. 41A illustrates part of chuck 1000 of a tool, such as a power tool (e.g., a drill). The chuck 1000 includes a plurality of jaws 1004 arranged about a central longitudinal axis 1008 in a radially symmetrical pattern. In the illustrated embodiment, the chuck 1000 includes three jaws 1004. In other embodiments, the chuck 1000 may include fewer or more jaws 1004. Together, the jaws 1004 define a hollow interior 1012 configured to receive a tool bit, such as a conventional tool bit or one of the tools bits with alignment regions described above. The jaws 1004 are movable relative to each to receive and clamp down on the tool bit. In some embodiments, the jaws 1004 slide linearly to move toward and away from each other. Additionally, the chuck 1000 may be rotated or otherwise manipulated to move the jaws 1004 toward and away from each other.

FIG. 41B-47 illustrate one of the jaws 1004 of the chuck 1000 in more detail. The jaw 1004 includes a first end portion 1016 adjacent and connected to the tool and a second end portion 1020 opposite the first end portion 1016. When multiple jaws 1004 are positioned together in the chuck 1000, the second end portions 1020 together define an end 1024 (FIG. 41A) of the jaws 1004.

The hollow interior 1012 is defined by inner surfaces 1028 of the jaws 1004 and is configured to receive a tool bit. The hollow interior 1012 extends through the end 1024 of the jaws 1004 so that the tool bit can be inserted into the hollow interior 1012 through the end 1024. The hollow interior 1012 is at least partially defined by a non-circular profile. In the illustrated embodiment, the non-circular profile is a hexagonal or hex-shaped profile formed when multiple jaws 1004 are positioned together. In other embodiments, the non-circular profile may be other suitable profiles, such as D-shaped, flattened, oblong, triangular, square, octagonal, star-shaped, irregular, and the like.

Each jaw 1004 also includes an alignment region 1032. The alignment region 1032 is formed in the second end portion 1020 of each jaw 1004, between the end 1024 of the jaws 1004 and the non-circular profile. The alignment region 1032 facilitates aligning the tool bit with the non-circular profile during insertion of the tool bit. In the illustrated embodiment, the alignment region 1032 includes a chamfer 1036. When multiple jaws 1004 are positioned together (as shown in FIG. 41A), the illustrated chamfers 1032 have a similar profile as the non-circular profile formed by the inner surfaces 1028 of the jaws 1004. Specifically, the chamfers 1032 form a hex-shaped profile that helps align (e.g., "clock") a hex-shaped shank of a tool bit with the non-circular profile before the hex-shaped shank reaches the non-circular profile. The tool bit can, thereby, be more easily inserted into the chuck 1000 without either having to perfectly align the tool bit with the non-circular profile and/or spread the jaws 1004 further apart from each other.

Figure 48A:
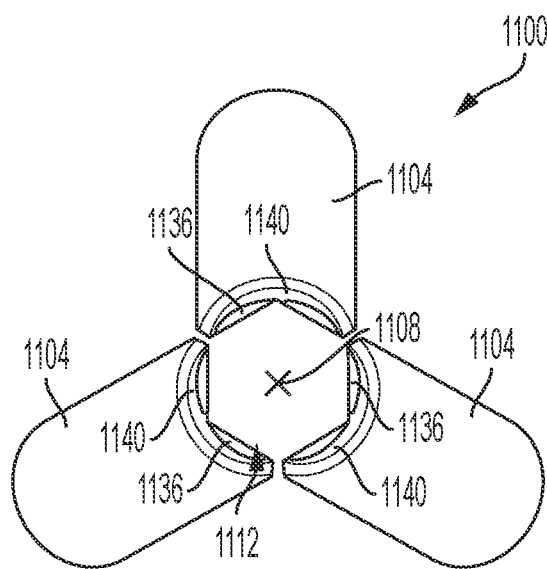
FIG. 48A is an end view of a chuck including a plurality of jaws according to an embodiment of the invention.
Figure 48B:
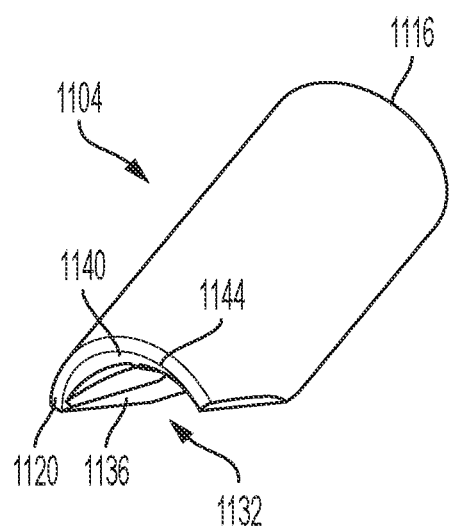
FIG. 48B is a perspective view of one of the jaws of FIG. 48A, the jaw including a swept profile.
Figure 49:
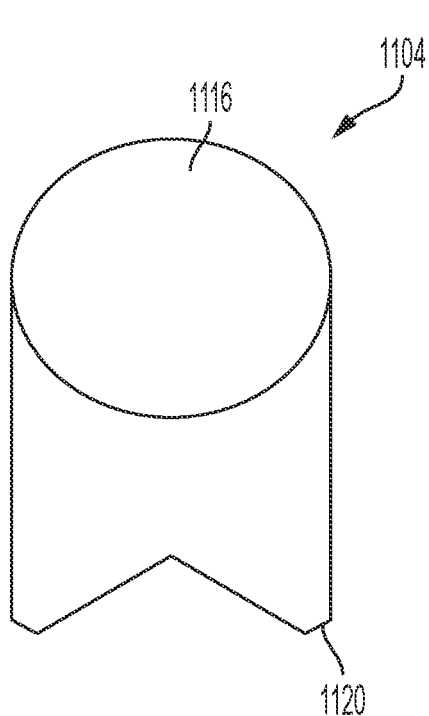
FIG. 49 is a rear view of the jaw of FIG. 48B.
Figure 50:
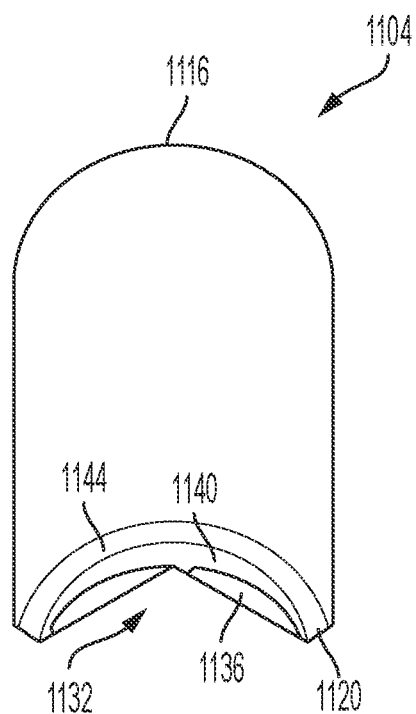
FIG. 50 is a front view of the jaw of FIG. 48B.
Figure 51:
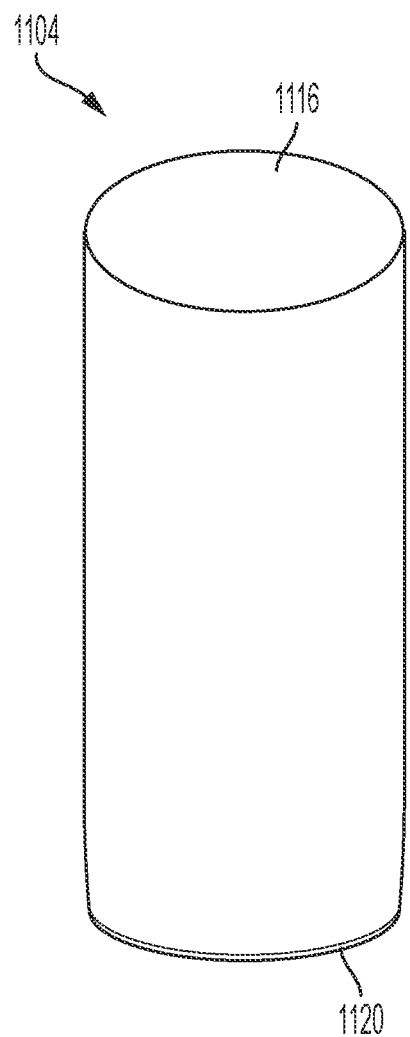
FIG. 51 is a top view of the jaw of FIG. 48B.

FIG. 48A illustrates another part of a chuck 1100 of a tool, such as a power tool (e.g., a drill). The chuck 1100 is similar to the chuck 1000 described above, and differences between the chuck 1100 and the chuck 1000 are noted below. The chuck 1100 includes a plurality of jaws 1104 arranged about a central longitudinal axis 1108 in a radially symmetrical pattern. Together, the jaws 1104 define a hollow interior 1112 configured to receive a tool bit.

As shown in FIGS. 48B-54, each jaw 1104 includes a first end portion 1116, a second end portion 1120, and an inner surface 1128. Each jaw 1104 also includes an alignment region 1132 formed in the second end portion 1120. In the illustrated embodiment, the alignment region 1132 includes a swept profile 1136. The swept profile 1136 is defined by sweeps that transition into a non-circular profile of the hollow interior 1112 that is defined by the inner surfaces 1128. The sweeps include grooves and projections that gradually transition from a circular opening to the non-circular profile of the hollow interior 1112 to automatically align a tool bit with the non-circular profile. The sweeps gradually project further into the hollow interior to gradually decrease the diameter of the hollow interior 1112.

Figure 52:
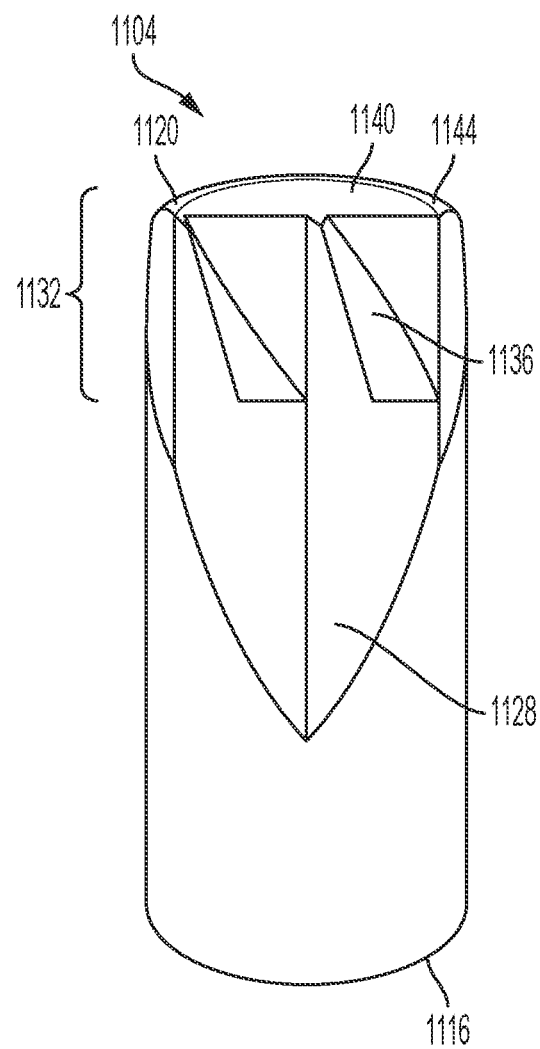
FIG. 52 is a bottom view of the jaw of FIG. 48B.
Figure 53:
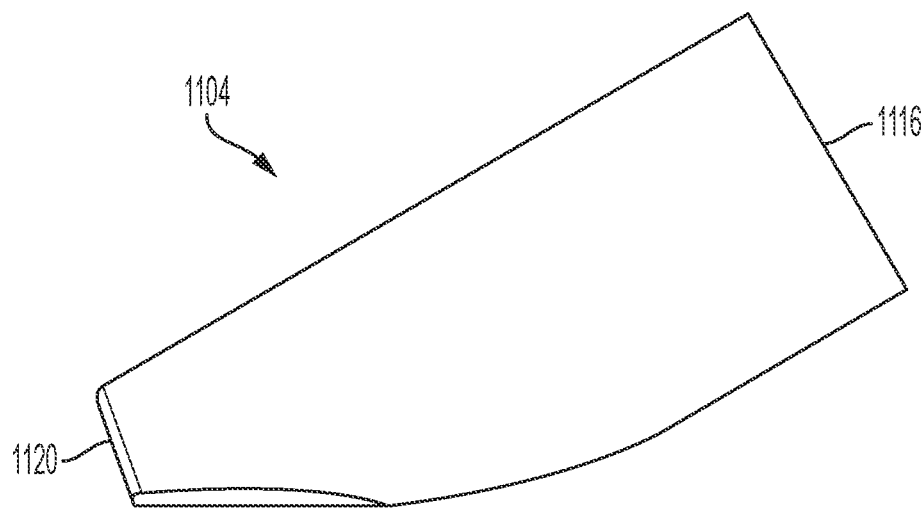
FIG. 53 is a first side view of the jaw of FIG. 48B.
Figure 54:
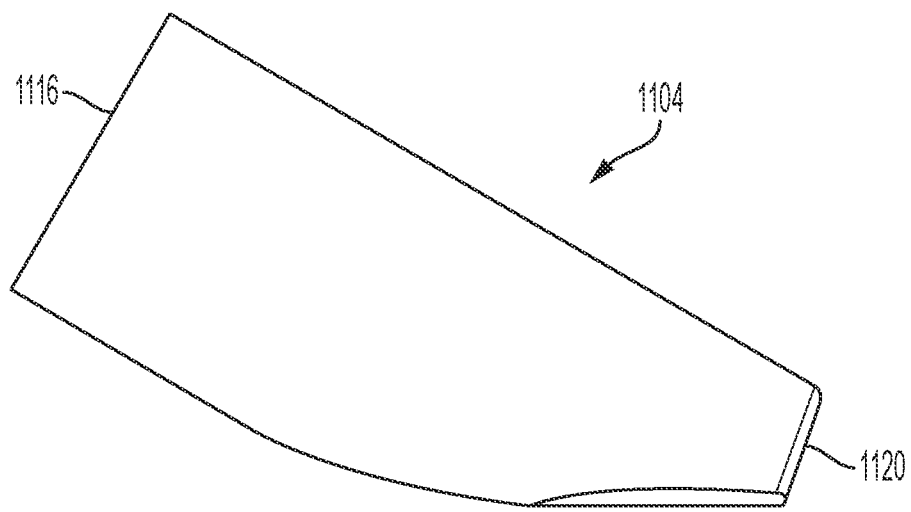
FIG. 54 is a second side view of the jaw of FIG. 48B.

As shown in FIG. 52, in the illustrated embodiment, the swept profile 1136 is also a rotated profile. That is, the swept profile 1136 is rotated or angled relative to the central longitudinal axis 1108 (FIG. 48A) of the chuck 1100. Such an arrangement helps automatically rotate a tool bit to align with the non-circular profile of the hollow interior 1112 as the tool bit is inserted into the chuck 1000.

The illustrated alignment region 1132 also includes a chamfer 1140. The chamfer 1140 extends from an end 1144 of the jaw 1004 to the swept profile 1136. In the illustrated embodiment, the chamfer 1140 has a first or circular profile that gradually decreases in diameter from the end 1144 of the jaw 1004 to the swept profile 1136. In other embodiments, the chamfer 1140 may have a non-circular profile, similar to the chamfer 1036 described above with reference to FIGS. 41A-47. In further embodiments, the chamfer 1140 may be omitted.

The above-described swept profiles can be achieved by having at least one sweep cut of a profile rotating in depth. The swept profiles should at least partially correspond to the intended bit shape. An extruded cut is then made up to the swept surface such that undercuts that could block bit insertion and/or make manufacturing hurdles are avoided.

In further embodiments, the cross-sectional shapes of the bit holders or chucks and the tool bits do not have to match. For example, the concept can be used to move a hex shank into a triangular bit holder, or vise versa.

The tool bit holders described above may be parts of tools, such as power tools or hand tools, or may be separate bit holders, such as drive guides. In addition, the tool bits described above may be any type of bit that is removably coupled to a tool, such as a screwdriver bit, a Torx bit, a socket, a drill bit, an auger, a chisel, an extender, and the like. The chuck and the jaws described above may be part of any suitable power tool or hand tool, such as a drill, a drill press, a hammer drill, a rotary hammer, a screwdriver, and the like.

Although the invention has been described above with reference to certain preferred embodiments, variations exist within the spirit and scope of the present invention. Various features and advantages of the invention are set forth in the following claims.

What is claimed is:

1. A tool bit connectable to a tool, the tool bit comprising:
   a working end portion;

an insertion end portion defining a first profile and having an outer surface formed on the insertion end portion, the insertion end portion defining an end of the tool bit and configured to be coupled to the tool;

a non-circular profile formed on the tool bit and partially defining the outer surface; and an alignment region positioned between the non-circular profile and the end of the tool bit, the alignment region partially defining the outer surface and including projections that gradually transition from the first profile to the non-circular profile to facilitate alignment of the non-circular profile with the tool.

2. The tool bit of claim 1, wherein the alignment region includes a swept profile.

3. The tool bit of claim 2, wherein the tool bit defines a central longitudinal axis extending through the working end portion and the end of the tool bit, and wherein the swept profile is rotated about the central longitudinal axis.

4. The tool bit of claim 1, wherein the alignment region includes a chamfer, wherein the chamfer increases a diameter of the outer surface from the end of the tool bit and wherein the chamfer has a similar profile as the non-circular profile.

5. The tool bit of claim 1, further comprising a circular region formed on the insertion end portion between the end of the tool bit and the non-circular profile.

6. The tool bit of claim 1, wherein the alignment region includes a chamfer extending from the end of the tool bit toward the working end portion, and a swept profile positioned between the chamfer and the non-circular profile.

7. The tool bit of claim 6, wherein the swept profile transitions from the chamfer to the non-circular profile.

8. The tool bit of claim 1, wherein cross-sections taken along the alignment region at spaced apart planes that are parallel with the end of the tool bit have differing geometries.

9. The tool bit of claim 1, wherein the non-circular profile is a hexagonal profile.

10. The tool bit of claim 1, wherein the tool bit further includes a connecting portion between the working end portion and the insertion end portion, the connecting portion configured to receive a release mechanism of the tool.

11. The tool bit of claim 10, wherein the connecting portion is configured to receive a ball bearing.

12. A tool bit connectable to a tool, the tool bit comprising:

a working end portion at a first end of the tool bit;
an insertion end portion at a second end of the tool bit;
a connecting portion extending between the working end portion and the insertion end portion;
a circular region formed on the insertion end portion and extending from the second end of the tool bit toward the first end of the tool bit;
a non-circular region formed on the insertion end portion between the circular region and the connecting portion; and an alignment region positioned between the non-circular region and the circular region, the alignment region including protrusions configured to gradually and geometrically transition the circular region into the non-circular region.

13. The tool bit of claim 12, wherein the alignment region includes a swept profile including a plurality of swept portions, each swept portion including a first face and a second face, the first face having a larger area than the second face to facilitate rotational alignment between the tool bit and a tool bit holder of the tool.

14. The tool bit of claim 12, wherein the alignment region includes a swept profile including a plurality of curved surfaces.

15. A method for inserting a tool bit into a tool bit holder, the tool bit including a working end portion and an insertion end portion defining an end of the tool bit and a first profile, the insertion end portion having an outer surface formed on the insertion end portion, the tool bit holder including a holder body having a hollow interior, the method comprising:

providing a non-circular profile on the tool bit that partially defines the outer surface;

providing a non-circular profile in the holder body that partially defines the hollow interior;

providing an alignment region on the tool bit between the end of the tool bit and the non-circular profile on the tool bit, the alignment region including projections that gradually transition from the first profile to the non-circular profile on the tool bit;

inserting the end of the tool bit into the hollow interior of the tool bit holder in any orientation; and engaging the alignment region with the tool bit holder to automatically align the non-circular profile on the tool bit with the non-circular profile in the holder body.

16. The method of claim 15, further comprising rotating the tool bit relative to the tool bit holder as the alignment region engages the tool bit holder.

17. The method of claim 15, wherein providing the alignment region includes providing a swept profile.

18. The method of claim 17, wherein engaging the alignment region with the tool bit holder includes engaging the swept profile with the non-circular profile in the holder body to automatically rotationally align the non-circular profile on the tool bit body with the non-circular profile in the holder body.

19. The method of claim 15, wherein providing the alignment region includes providing a chamfer having a similar profile as the non-circular profile on the tool bit.

20. The method of claim 19, wherein engaging the alignment region with the tool bit holder includes engaging the chamfer with the non-circular profile in the holder body to automatically radially align the non-circular profile on the tool bit with the non-circular profile in the holder body.

* * * * *